United States Patent [19]

Rasshofer

[11] Patent Number: 4,532,317

[45] Date of Patent: Jul. 30, 1985

[54] AROMATIC POLYAMINES CONTAINING PRIMARY AROMATIC AMINO GROUPS, URETHANE GROUPS AND POLYESTER GROUPS, AND A PROCESS FOR THE PRODUCTION THEREOF

[75] Inventor: Werner Rasshofer, Cologne, Fed. Rep. of Germany

[73] Assignee: Bayer Aktiengesellschaft, Leverkusen, Fed. Rep. of Germany

[21] Appl. No.: 506,461

[22] Filed: Jun. 21, 1983

[30] Foreign Application Priority Data

Jun. 23, 1982 [DE] Fed. Rep. of Germany ....... 3223395

[51] Int. Cl.³ .................. C07C 127/15; C07C 127/24
[52] U.S. Cl. ......................................... 528/60; 528/64; 528/480; 528/488; 528/489; 528/482; 560/24; 560/157; 560/159; 564/38; 564/57; 564/59; 564/61; 564/511; 564/512
[58] Field of Search ................... 528/60, 64, 480, 488, 528/489, 482; 560/24, 157; 564/38, 57, 59, 60, 511, 512

[56] References Cited

U.S. PATENT DOCUMENTS

| 3,385,829 | 5/1968 | Heydkamp et al. | 260/75 |
| 3,931,450 | 1/1976 | Patton, Jr. et al. | 521/137 |
| 4,224,417 | 9/1980 | Hajek et al. | 521/166 |
| 4,286,074 | 8/1981 | Davis et al. | 521/137 |
| 4,386,218 | 5/1983 | Rasshofer et al. | 564/38 |

FOREIGN PATENT DOCUMENTS

| 079536 | 5/1983 | European Pat. Off. |
| 1056367 | 4/1959 | Fed. Rep. of Germany |
| 2447748 | 4/1975 | Fed. Rep. of Germany |
| 2948419 | 12/1979 | Fed. Rep. of Germany |
| 538003 | 2/1977 | U.S.S.R. |

OTHER PUBLICATIONS

Patent Abstracts of Japand, Band 4, No. 34, Mar. 22, 1980, p. 363c-JP-A-55,7829.

*Primary Examiner*—John Kight
*Assistant Examiner*—Marvin L. Moore
*Attorney, Agent, or Firm*—Gene Harsh; Joseph C. Gil; Lyndanne M. Whalen

[57] ABSTRACT

Aromatic polyamines containing aromatic primary amino groups as well as urethane and polyester groups are made by hydrolyzing an isocyanate in the presence of a basic material and water to form a carbamate and then converting the carbamate groups to amino groups. The isocyanate starting material contains aromatic isocyanate groups (as well as urethane and polyester groups) and has an NCO content of from 0.5 to 11.5 wt %. The basic compound is selected from alkali metal hydroxides, alkaline earth metal hydroxides, alkali metal silicates, alkali metal sulfides, alkali metal cyanides, tetraalkylammonium hydroxides and mixtures thereof. Water is used in a quantity such that at least one mole of water is present for each equivalent of NCO groups. The carbamate groups may be converted to amino groups by treating the carbamate-containing mixture with a proton donor or with heat or with a solvent. The product polyamines are particularly useful in the production of polyurethanes.

27 Claims, No Drawings

AROMATIC POLYAMINES CONTAINING PRIMARY AROMATIC AMINO GROUPS, URETHANE GROUPS AND POLYESTER GROUPS, AND A PROCESS FOR THE PRODUCTION THEREOF

BACKGROUND OF THE INVENTION

The present invention relates to a process for the preparation of compounds containing primary aromatic amino groups, urethane groups and polyester groups by alkaline hydrolysis of suitable isocyanate prepolymers and the products of this process.

Compounds containing primary aromatic amino groups and ester groups are known. German Auslegeschrift No. 2,447,748 is directed to a process for the preparation of polymeric polyamines from a polyurethane prepolymer. The prepolymer may be prepared from a polyester polyol and excess diisocyanate. The polyamine is produced by complex formation of the prepolymer with a virtually anhydrous, non-oxidizing organic or inorganic acid. The complex is then destroyed and the mixture is neutralized with an aqueous alkaline solution. Urethane oxypropylene aminodiamino-oligoesters are taught to be useful as hardeners for macrodiisocyanates in Russian Patent No. 538,003.

In U.S. Pat. No. 3,385,829, it is disclosed that nitroarylpolyurethanes which can be converted into the corresponding amines by catalytic hydrogenation may be prepared by reacting polyhydroxyl compounds, (e.g. polyhydroxyl compounds based on polyesters) with nitroarylisocyanates. It is also taught in that disclosure that products which are formed by the reaction of aromatic diisocyanates with polyol compounds (e.g. polyesters) can be converted into compounds containing formyl amido groups by means of formic acid. The formyl amido groups may then be hydrolyzed with dilute acids or bases to form amino groups.

In German Offenlegungsschrift No. 1,056,367, polypropylene glycol ethers are esterified on one side with aliphatic or aromatic dicarboxylic acids and the remaining carboxyl groups are reacted with excess diamines at 130° to 230° C. so that only one $NH_2$ function is bound as an acid amide.

German Auslegeschrift No. 2,546,536, discloses a process in which hydroxyl group-containing ketimines, aldimines or enamines are reacted with compounds containing isocyanate end groups. Hydrolysis of the resulting polyketimines, polyaldimines or polyenamines yields compounds containing amino end groups. If the hydroxyl group-containing enamines are alkylated on the nitrogen, polyesters may also be used to prepare the compounds containing isocyanate end groups and compounds containing ester groups and secondary aliphatic amino groups are obtained.

Each of these processes is either expensive and complicated and/or yields products which are too highly viscous for most applications. The reactions involved in the known processes also take place under conditions in which a considerable proportion of the original ester groups are destroyed, e.g. with simultaneous hydrolysis, amide formation or transesterification. Consequently, these processes are not commercially significant.

SUMMARY OF THE INVENTION

It is an object of the present invention to produce polyamines containing aromatic primary amino groups as well as urethane and polyester groups.

It is also an object of the present invention to provide a process for the production of polyamines containing aromatic primary amino groups as well as urethane and polyester groups.

It is another object of the present invention to provide a simple process for the production of polyamines containing a high proportion of aromatic amino groups and in which the original polyester structure is substantially preserved in high yield within relatively short reaction times.

These and other objects which will be apparent to those skilled in the art are accomplished by hydrolyzing an isocyanate compound in the presence of a basic compound and water and then recovering the polyamine thus-produced. The isocyanate starting material has aromatic isocyanate groups, an isocyanate content of from 0.5 to 11.5 wt % and also contains urethane and polyester groups. The basic compound is at least one compound selected from the group of alkali metal hydroxides, alkaline earth metal hydroxides, alkali metal silicates, alkali metal sulfides, alkali metal cyanides and tetraalkylammonium hydroxides. Water is used in a quantity such that at least one mol of water is present for each equivalent of isocyanate groups. The polyamine may be recovered by treating the hydrolyzed mixture with a proton donor or with heat or with a solvent.

DETAILED DESCRIPTION OF THE INVENTION

It has surprisingly been found that the methods for alkaline hydrolysis of isocyanate prepolymers useful in the preparation of polyether-based polyamines (described in German Auslegeschrift No. 2,948,419) are also suitable, optionally in a modified form, for producing polyamines containing terminal aromatic amino groups, urethane groups and ester groups in high yield. Other groups such as urea, biuret, allophanate, isocyanurate, carbodiimide, amide and/or additionally also ether, thioether, acetal or dialkyl-siloxane groups from polyester-based isocyanate prepolymers containing aromatic isocyanate end groups may also be present. Prepolymers produced from low molecular weight aromatic polyisocyanates, polyols containing ester groups and having average molecular weights in the range of 400 to 12000 (preferably 500 to 4000) and optionally low molecular weight within the range of 18 to 399) chain lengthening agents may be used in the process of the present invention.

The present invention relates to a process for the preparation of polyamines containing primary aromatic amino groups, urethane groups, polyester groups and optionally other groups typically present in isocyanates by alkaline hydrolysis of compounds containing aromatically bound isocyanate groups.

The isocyanate compounds useful as starting materials have an isocyanate content of from 0.5 to 11.5 wt %, preferably 1.7 to 7.2 wt %, most preferably 2.2 to 6.5 wt % and contain aromatic isocyanate groups, urethane groups and polyester groups and optionally other groups. The isocyanate may be dissolved in an isocyanate inert solvent. The isocyanates are converted into a reaction mixture containing aromatically bound carbamate groups, urethane groups, polyester groups and optionally other groups of isocyanate chemistry by mixing with alkali metal hydroxides, alkaline earth metal hydroxides, alkali metal silicates, alkali metal sulphides, alkali metal cyanides and/or tetraalkylammonium hydroxides and a sufficient quantity of water to provide at least 1 mol of water per equivalent of isocyanate groups, and optionally solvents. Low molecular weight compounds within the range of 18 to 399, preferably 62 to 250) containing at least one hydroxyl and/or amino group and/or other hydrogen active groups may also be included in the mixture. In order to recover the aromatic polyamine from the thus-formed reaction mixture containing carbamate groups, the reaction mixture may be treated with a proton donor (to neutralize any base still present) separated and/or heat treated and/or treated with a solvent, optionally heat treated. The polyamine may then be separated from the treated mixtures.

In the process of the present invention, the isocyanate compounds used are generally isocyanate prepolymers containing at least one, preferably 2 to 8, most preferably 2 or 3 aromatic isocyanate groups. Appropriate prepolymers may be obtained by reacting aromatic polyisocyanates (especially aromatic diisocyanates) with relatively high molecular weight polyesters of dicarboxylic acids and polyols (excluding polylactones and polycarbonates) containing at least one hydroxyl group (preferably 2 to 8, most preferably 2 or 3 hydroxyl groups) and having molecular weights in the range of 400 to 12000, (preferably 500 to 5000, most preferably 1000 to 4000). Up to 50 wt % (preferably up to 20 wt %) of the hydroxyl group-containing material may be relatively high molecular weight polyhydroxyl compounds containing at least one hydroxyl group (preferably 2 to 8, most preferably 2 or 3 hydroxyl groups) such as polyethers, polyacetals, polythioethers, polycarbonates, polysiloxanes or polybutadienes with molecular weights from 400 to 12000 (preferably 500 to 5000, most preferably 1000 to 4000). Chain lengthening agents with molecular weights from 18 to 399 (preferably from 62 to 250) which preferably have a functionality of 2 to 4 and optionally contain hydrogen active groups may be used. The equivalent ratio of groups containing active hydrogen atoms to the isocyanate groups in the prepolymer used as the starting material in the present invention should generally be in the range of 1:1.5 to 1:2.8, preferably from 1:1.5 to 1:2, and the isocyanate content should be from 0.5 to 11.5 wt % (preferably from 1.7 to 7.2 wt %).

In the process of the present invention, hydrolysis of the isocyanate group is carried out using a "base" in a quantity such that the ratio of equivalents of base to isocyanate groups is from 0.3:1 to 2:1, preferably 0.6:1.8, most preferably 0.8:1.1. Suitable "bases" include alkali metal hydroxides, alkaline earth metal hydroxides, alkali metal silicates, alkali metal sulfides, alkali metal cyanides and/or tetraalkylammonium hydroxides. Solvents may also be present in the mixture to be hydrolyzed. Compounds having a molecular weight of from 62 to 250 containing hydrogen active groups, preferably containing 2 to 4 hydrogen active groups from the series of hydroxyl and/or amino groups, may also be used.

The hydrolyzed reaction mixture which contains carbamate groups, may be treated with at least 1 equivalent of a proton donor (based on the equivalent quantity of "base" used in the hydrolysis). This proton donor may be selected from mineral acids, organic acids and/or acids fixed in an insoluble polymer skeleton (e.g. acid ion exchangers).

The reaction mixture containing carbamate groups may also be treated at temperatures of up to 200° C. (preferably up to 160° C.) to thermally decompose the carbamate. This treatment may be conducted in the presence of solvents and/or with application of a vacuum, with or without partial neutralization with proton donors.

The reaction mixture containing carbamate groups may also be extracted with a water-immiscible solvent to decompose the carbamate. The polyamine thus obtained may be separated and purified by phase separation, crystallization or extraction, depending upon the properties of the diamine.

In one embodiment of the process of the present invention, a compound containing at least one "hydrogen active group" such as hydroxyl and/or amino groups (e.g. mono- or polyols, amino alcohols or mono- or polyamines, preferably diols) is added to the alkaline hydrolysis medium of "base" and water. The term "hydrogen active group" denotes groups such as OH, $-NH_2$, $=NH$, $-SH$, $-CO.NH.NH_2$, $-COOH$, $-NH.CO-$ or activated methylene groups which contain Zerewitinoff active hydrogen atoms which are reactive with isocyanate groups.

Generally formation of urea groups occurs readily, particularly when the base/NCO ratio is from 1.01 to 1.2. Consequently, products prelengthened by way of urea groups are formed. When the base and isocyanate are used in equivalent quantities or the base is present in a less than equivalent quantity (base/NCO $\leq$ 1.0, e.g. 0.8 to 1.0), urea formation is further increased. Although such polyamines containing urea groups are valuable for some purposes, a low viscosity product which is free from urea groups is in most cases preferred for ease of handling.

Isocyanate prepolymers and other isocyanate compounds generally contain some monomeric polyisocyanate (e.g. tolylene diisocyanate) which is converted into monomeric polyamine (e.g. tolylene diamine) by hydrolysis. For many applications, however, it is desirable that substantially no free low molecular weight amine be present. Formation of free amine can be largely avoided by subjecting the low molecular weight isocyanate compounds containing polyisocyanates to distillation, optionally with application of a vacuum (e.g. by means of a so-called thin layer evaporator) before hydrolyzing that isocyanate. This distillation step is, however, quite expensive. Monomers may also be substantially removed by adding hydroxyl compound to the isocyanate prepolymer. The dwell times in the tank and production costs are increased when this alternative is exercised.

In many applications, polyamines containing aromatic amino end groups are preferably used as mixtures with other polyamines containing amino end groups. An example of such a mixture is an aminopolyester having a molecular weight of from 2000 to 4000 and an aminopolyester having a molecular weight of from 300 to 1900. Although such mixtures may be prepared by mixing two or more polyamines together, this presupposes that the two polyamines are miscible or soluble with each other, but this is not always the case. Moreover, it is uneconomical to carry out the same process steps several times for the preparation of one reaction component. Such polyamine mixtures may also be prepared by hydrolyzing the corresponding isocyanate prepolymer mixtures. Again, two different isocyanate prepolymers would have to be prepared. However, the lower molecular weight isocyanates frequently solidify or crystallize causing problems with respect to solubility.

Polyamine mixtures may also be prepared by adding other isocyanate reactive components containing reactive hydrogen atoms (e.g. diols) to an isocyanate prepolymer which still contains free polyisocyanates. These other isocyanate reactive components preferably react with the free monomeric polyisocyanates before the isocyanate prepolymer mixture is hydrolyzed. This method is also disadvantageous in that a second step is required and in some cases the low molecular weight isocyanate prepolymers are only slightly soluble in the higher molecular weight isocyanate prepolymers.

The possibility of precipitating low molecular weight isocyanate prepolymers may be reduced by adding other compounds with reactive hydrogen atoms (e.g. diols) to a relatively high molecular weight isocyanate prepolymer so that chain prelengthening takes place. Aside from the fact that a second reaction step is again required, this prelengthened isocyanate prepolymer mixture undergoes a sharp rise in viscosity. This is disadvantageous for the above-described hydrolysis processes which require an isocyanate component having as low a viscosity as possible. This alternative (i.e., prelengthening of prepolymer) may therefore necessitate the use of solvents.

These disadvantages may be overcome by reacting the isocyanate prepolymers with a base and water and a compound containing H-active groups in the alkaline reaction medium and then recovering the aromatic polyamine which is modified in the hydrolysis reaction from the "carbamate intermediate stage" by methods such as those described above.

The process of the present invention is particularly advantageous in that conversion of the isocyanate compounds into polyamines is carried out by a simple and economical one-shot process. Further, the components on which the isocyanate compounds are based (polyisocyanates, modified polyisocyanates, relatively high molecular weight polyester polyols, low molecular weight polyols, polyamines, etc.) are inexpensive products which are commercially available in large quantities. Another advantage of the present invention is that the reaction yields are virtually quantitative and the volume/time yield of the one-shot reaction is high. Additionally, ordinary reaction vessels may be used without special equipment or apparatus and the process may be carried out continuously.

The process of the present invention is environmentally safe since it may be carried out without solvents and in its preferred embodiment may result in the release of only small quantities of carbon dioxide and the production of only minimum quantities of salt (carbonic acid salts from the bases). In the embodiment in which the prepolymer is prelengthened before hydrolysis, aromatic polyamines which are virtually free from monomeric polyamines may be obtained from isocyanate compounds containing free low molecular weight polyisocyanates without any modifying treatment.

Polyamines containing different segments in one molecule linked through urethane groups, for example, can easily be obtained in one reaction step by the process of the present invention. Further, a trifunctional or higher functional aromatic polyamine may be obtained from, for example, a difunctional isocyanate compound by using a higher functional compound containing "H-active groups" (such as a polyol, polyamine, monohydroxymonoamine or diamine, dihydroxymonoamine or polythiol).

The present invention also relates to the use of the compounds containing aromatic primary amino groups, urethane groups, polyester groups and optionally other groups known in isocyanate chemistry obtained by the process of the present invention for the production of cellular or non-cellular polyurethane resins and foams. These polyurethanes may be produced by reacting polyisocyanates and/or blocked polyisocyanates or isocyanate prepolymers with the aromatic polyamines prepared by the process of the present invention and optionally other compounds containing isocyanate reactive groups, optionally in the presence of known auxiliary agents and additives.

The isocyanate compounds containing two or more aromatic isocyanate groups, urethane groups, polyester groups and optionally other groups which are used as starting materials in the process of the present invention are preferably isocyanate prepolymers. Suitable prepolymers may be obtained in known manner by reacting compounds having OH end groups and at least two (preferably more than four) ester groups with an excess of aromatic polyisocyanates. Relatively high molecular weight polyester polyols obtained from polycarboxylic acids and polyols having a molecular weight of from 400 to 12000 are particularly preferred OH-group containing compounds.

The polyisocyanates used to prepare compounds containing free isocyanate groups may in principle be any aromatic or heterocyclic polyisocyanates which are substantially free from hydrolyzable groups other than the isocyanate groups. Suitable polyisocyanates are described by W. Siefken in Justus Liebigs Annalen der Chemie, 562, pages 75 to 136, for example, those of the formula Q (NCO)$_n$ wherein n=2 to 4 (preferably 2) and Q represents an aromatic hydrocarbon residue having 6 to 15 carbon atoms or a heterocyclic residue, e.g. aromatic diisocyanates such as 1,3- and 1,4-phenylene diisocyanates, 2,4- and 2,6-tolylene diisocyanates and any mixtures of these isomers, diphenylmethane-2,4'- and/or -4,4'-diisocyanate including the alkyl- and chloro-substituted derivatives thereof, and naphthylene-1,5-diisocyanate. The 2,4'-diisocyanato-diphenylsulfides described in German Auslegeschrift No. 2,922,966 and the mono- to tetra-$C_1$-$C_8$-alkyl substituted diphenylmethane diisocyanates as described e.g. in European Patent Application No. 24,665 and German Auslegeschrift No. 2,935,318 are also suitable diisocyanates.

The following isocyanates may also be used: triphenylmethane-4,4',4"-triisocyanate; polyphenyl-polymethylene polyisocyanates obtained by anilineformaldehyde condensation followed by phosgenation (described, for example, in British Patent Nos. 874,430 and 846,671); m- and p-isocyanatophenylsulfonylisocyanates (U.S. Pat. No. 3,454,606); perchlorinated aryl polyisocyanates (described, e.g., in U.S. Pat. No. 3,277,138); aromatic polyisocyanates containing isocyanurate groups (described, e.g., in U.S. Pat. No. 3,001,973 and in German Patent Nos. 1,022,789; 1,222,067; 1,027,394; 1,929,034 and 2,004,048); aromatic polyisocyanates containing urethane groups (described, e.g., in Belgian Patent No. 752,261 or U.S. Pat. Nos. 3,394,164 and 3,644,457); aromatic polyisocyanates containing acylated urea groups (German Patent No. 1,230,778); aromatic polyisocyanates prepared by telomerization reactions (described, e.g., in U.S. Pat. No. 3,654,196) or polymer-containing polyisocyanates (U.S. Pat. No. 4,301,257). Mixtures of the above-mentioned polyisocyanates may also be used.

It is generally preferred to use commercially readily available polyisocyanates such as 2,4- and 2,6-tolylene diisocyanate and any mixtures of these isomers ("TDI"); polyphenyl-polymethylene polyisocyanates obtainable by aniline-formaldehyde condensation followed by phosgenation ("crude MDI"); and polyisocyanates containing urethane groups, isocyanurate groups or urea groups ("modified polyisocyanates"), in particular those modified polyisocyanates which are derived from 2,4- and/or 2,6-tolylene diisocyanate or from 4,4'- and/or 2,4'- and/or 2,2'-diphenylmethane diisocyanate. Tolylene diisocyanates are important from a technical point of view.

The compounds used for the preparation of the isocyanate free polymers preferably include at least 50 wt % of relatively high molecular weight compounds with molecular weights from 400 to 12000 (preferably from 500 to 5000 and most preferably from 1000 to 4000) containing at least 2 (preferably 2 to 4, most preferably 2 or 3) isocyanate reactive groups containing so-called "active H atoms". Polyesters containing hydroxyl groups are particularly preferred. Such polyesters are compounds containing at least two ester groups in the molecule and may be obtained from the polyesterification of polycarboxylic acids and polyols (excluding carbonic acid or hydroxycarboxylic acids or lactones). Suitable polyesters with hydroxyl groups include: the reaction products of polyhydric (preferably dihydric) alcohols with the optional addition of trihydric alcohols, and polybasic (preferably dibasic) carboxylic acids. Instead of the free polycarboxylic acids, the corresponding polycarboxylic acid anhydrides or corresponding polycarboxylic acid esters of lower alcohols or mixtures thereof may be used to prepare the polyesters. The polycarboxylic acids may be aliphatic, cycloaliphatic, aromatic and/or heterocyclic and they may be substituted, e.g. by halogen atoms, and/or unsaturated.

Specific examples of such carboxylic acids and their derivatives are: succinic acid, adipic acid, suberic acid, azelaic acid, sebacic acid, tetrahydrophthalic acid anhydride, hexahydrophthalic acid anhydride, endomethylene tetrahydrophthalic acid anhydride, glutaric acid anhydride, maleic acid, maleic acid anhydride, fumaric acid, dimerized and trimerized unsaturated fatty acids optionally in admixture with monomeric unsaturated fatty acids such as oleic acid. Aromatic polycarboxylic acids are only used in portions for modification (<25 mol % of the dicarboxylic acids). Examples of such aromatic acids are isophthalic acid, phthalic acid anhydride, tetrachlorophthalic acid anhydride or trimellitic acid.

Examples of suitable polyhydric alcohols include: ethylene glycol; 1,2-propylene glycol; 2,3-butylene glycol; 1,3-propanediol; 1,4-butanediol; 1,6-hexanediol; 1,8-octanediol; neopentyl glycol; 1,4-bis-hydroxymethyl cyclohexane; terephthalic acid-bis-(2-hydroxyethyl)-ester; 2-methyl-1,3-propanediol; glycerol; trimethylolpropane; 1,2,6-hexanetriol; 1,2,4-butanetriol; trimethylolethane; pentaerythritol; quinitol; mannitol; sorbitol; formitol; methylglycoside; dianhydrosorbitol; polyols containing ether groups, such as di-, tri- and tetra-ethyleneglycol and higher polyethylene glycols; di-, tri- and tetra-propylene glycol and higher polypropylene glycols; and di-, tri- and tetrabutylene glycol and higher polybutylene glycols. The polyesters may also contain a proportion of terminal carboxyl groups.

Monofunctional hydroxyl esters prepared with monofunctional acids or monofunctional alcohol may also be used for special purposes but difunctional and/or higher functional polyesters are preferred as starting materials for the preparation of polyurethanes.

These hydroxypolyesters are preferably used alone for the reaction with aromatic polyisocyanates although it is possible and for some purposes even preferred to use them in mixtures with other low molecular weight compounds (average molecular weight from 18 to 399) containing 1 to 4 (preferably 2 to 4, most preferably 2 or 3) hydroxyl and/or amino and/or thiol groups (most preferably 2 or 3 hydroxyl groups) and/or higher molecular weight compounds (average molecular weight from 400 to 12000) of this kind as cocomponents.

The low molecular weight or relatively high molecular weight compounds with groups containing "active H atoms" not derived from the polyester polyol are used in quantities of 0.1 to 100 mol % for each 100 mol % of the hydroxyl groups derived from the polyester polyols. The preferred quantities are from 0.1 to 50 mol %, most preferably from 1 to 20 mol %. The relatively high molecular weight compounds containing "H active groups" which may be used as cocomponents in the preparation of the isocyanate compounds used as starting materials include the usual relatively high molecular weight polyacetals, polythioethers, polycarbonates, polylactones, polyester amides, polysiloxanes and/or polybutadienes used in polyurethane chemistry which contain two or more OH groups (particularly polyethers containing hydroxyl groups). The molecular weight of these relatively high molecular weight compounds is generally from 400 to 12000, preferably from 500 to 5000 and most preferably from 1000 to 4000. Examples of these relatively high molecular weight compounds are polyethers containing generally 2 to 8 (preferably 2 or 3) hydroxyl groups prepared, for example, by the polymerization of epoxides such as ethylene oxide, propylene oxide, butylene oxide, tetrahydrofuran, styrene oxide or epichlorohydrin, either on their own in the presence of Lewis catalysts such as $BF_3$, or by the chemical addition of these epoxides, (preferably of ethylene oxide and propylene oxide, optionally as mixtures or successively) to starting components containing reactive hydrogen atoms. Appropriate starting components containing reactive hydrogen atoms are: water; ammonia; alcohols such as ethylene glycol, 1,3- or 1,2-propanediol, trimethylolpropane, glycerol, sorbitol, 4,4'-dihydroxydiphenylpropane; and amines such as aniline, ethanolamine or ethylene diamine. Sucrose polyethers and polyethers started on formitol or formose may also be used. It is frequently preferred to use polyethers containing predominantly primary OH groups (up to 90 wt % thereof, based on all the OH groups in the polyether). Polybutadienes containing OH, NH and/or SH groups are also suitable according to the invention (see Progress Org. Coatings, Volume 7 (3), 289–329 (1979)).

Suitable polyacetals include the compounds obtainable from glycols such as di- or triethylene glycol, 4,4'-dihydroxyethoxy-diphenylmethane, hexanediol and formaldehyde. Suitable polyacetals for purposes of the invention may also be prepared by the polymerization of cyclic acetals such as trioxane.

Among the polythioethers, the condensation products obtained by the reaction of thiodiglycol on its own and/or with other glycols are useful in the practice of the present invention.

Polyhydroxyl compounds already containing urethane or urea groups and modified or unmodified natural polyols may also be used. Products of chemical addition of alkylene oxides to phenol formaldehyde resins or to urea formaldehyde resins may also be used in practicing the present invention.

Polyhydroxyl compounds containing high molecular weight polyadducts or polycondensates or polymers in a finely dispersed or dissolved form may also be used. Such polyhydroxyl compounds may be obtained, for example, by carrying out polyaddition reactions (e.g. reactions between polyisocyanates and aminofunctional compounds) or polycondensation reactions (e.g. between formaldehyde and phenols and/or amines) in situ in the abovementioned hydroxyl-containing compounds such as polyesters or polyethers. Processes of this kind have been described, for example, in German Offenlegungsschriften Nos. 1,168,075 and 1,260,142 and in German Auslegeschriften Nos. 2,324,134; 2,423,984; 2,512,385; 2,513,815; 2,550,797; 2,550,833; 2,550,862; 2,633,293 and 2,639,234. These products may also be obtained by the method described in U.S. Pat. Nos. 3,869,413 or 2,550,860 in which a previously prepared aqueous polymer dispersion is mixed with a polyhydroxyl compound and the water is subsequently removed from the mixture.

Polyhydroxyl compounds modified by vinyl polymers are also suitable for the practice of the present invention. Specific examples of such compounds are the polyhydroxyl compounds obtained by the polymerization of styrene and acrylonitrile in the presence of relatively high molecular weight polyols such as polyethers (U.S. Pat. Nos. 3,383,351; 3,304,273; 3,523,093 and 3,110,695; German Offenlegungsschrift No. 1,152,536) or polycarbonate polyols (polyesters) (German Patent No. 1,769,795; U.S. Pat. No. 3,637,909). When using polyether polyols which have been modified according to German Auslegeschriften Nos. 2,442,101, 2,644,922 or 2,646,141 by graft polymerization with vinyl phosphonic acid esters and optionally (meth)acrylonitrile, (meth)acrylamide or OH functional (meth)acrylic acid esters, polymer products with exceptionally high flame resistance are obtained. Polyhydroxyl compounds into which carboxyl groups have been introduced by radical graft polymerization with unsaturated carboxylic acids and optionally other olefinically unsaturated monomers (German Auslegeschriften Nos. 2,714,291; 2,739,620 and 2,654,746) may be used to special advantage in combination with mineral fillers.

Polymers based on polyesters (instead of on polyethers) used as the sole starting materials or as components of a mixture for the preparation of isocyanate prepolymers may also be converted into isocyanate prepolymers and saponified to polymer-containing polyester-based aromatic polyamines in accordance with the process of the present invention.

In accordance with the present invention, the polyester isocyanate prepolymers may be converted into aromatic polyester polyamines and subsequently (grafted) polymerized (for example with styrene and/or acrylonitrile) to form polyester-based polymer-containing aromatic polyamines.

Representatives of the above-mentioned relatively high molecular weight polyhydroxyl compounds suitable for use in the present invention have been described, for example, in High Polymers, Vol. XVI, "Polyurethanes, Chemistry and Technology", by Saunders-Frisch, Interscience Publishers, New York, London, Volume I, 1962, pages 32–42 and pages 44–54, and Volume II, 1964, pages 5 to 6 and 198 to 199; and in Kunststoff Handbuch, Volume VII, Vieweg-Höchtlen, Carl-Hanser-Verlag, Munich, 1966, e.g. on pages 45 to 71. Mixtures of the above-mentioned compounds having molecular weights of from 400 to 12000 and containing at least two isocyanate reactive hydrogen atoms may, of course, also be used (e.g., mixtures of various polyesters or mixtures of polyesters with (minor) quantities of polyethers or other relatively high molecular weight polyhydroxyl compounds).

The components used as the low molecular weight compounds containing isocyanate reactive groups with active hydrogen atoms (briefly referred to as "H-active groups" or as "groups containing Zerewitnoff active hydrogen") to prepare the isocyanate compounds used as starting compounds in the process of the present invention may contain at least two isocyanate reactive hydrogen atoms and have a molecular weight of from 18 to 399 (preferably from 62 to 250). These compounds include water and/or other compounds containing hydroxyl groups and/or amino groups and/or thiol groups, preferably hydroxyl groups. Such compounds are known to those skilled in polyurethane chemistry as chain lengthening agents or cross-linking agents. These compounds generally have 2 to 8, preferably 2 to 4, most preferably 2 isocyanate reactive hydrogen atoms. These compounds may be used as mixtures of different compounds each containing at least two isocyanate reactive hydrogen atoms and having a molecular weight of from 18 to 399.

The following are specific examples of such low molecular weight compounds containing isocyanate reactive groups: water; ethylene glycol; 1,2- and 1,3-propanediol; (1,4)- and (2,3)-butanediol; 1,5-pentanediol; 1,6-hexanediol; 1,8-octanediol; neopentyl glycol; 1,4-bis-hydroxymethylcyclohexane; 2-methyl-1,3-propanediol; dibromobutenediol (U.S. Pat. No. 3,723,392); glycerol; trimethylolpropane; 1,2,6-hexanetriol; trimethylolethane; pentaerythritol; quinitol; mannitol; sorbitol; dianhydrohexitols; castor oil; di-, tri- and tetra-ethyleneglycol; di-, tri- and tetrapropylene glycol; dibutylene glycol and higher polyethylene, polypropylene and polybutylene glycols with molecular weights of up to 399; 4,4'-dihydroxy-diphenylpropane; dihydroxymethylhydroquinone; ethanolamine; diethanolamine; N-methyl-diethanolamine; triethanolamine and 3-aminopropanol. The low molecular weight polyols used may also be mixtures of hydroxyaldehyde and hydroxyketones ("formoses") and the polyhydric alcohols ("formitols") obtained from them by reduction, such as the compounds obtained from the autocondensation of formaldehyde hydrate in the presence of metal compounds as catalysts and compounds capable of enediol formation as cocatalysts (German Auslegeschriften Nos. 2,639,084; 2,714,084; 2,714,104; 2,271,186; 2,738,154 and 2,738,512).

Also suitable for purposes of the present invention but generally less preferred are aliphatic diamines such as ethylenediamine; 1,4-tetramethylenediamine; 1,6-hexamethylenediamine; 1,12-dodecamethylene diamine and mixtures thereof; 1-amino-3,3,5-trimethyl-5-aminomethyl cyclohexane ("isophorone diamine"); 2,4-and 2,6-hexahydrotolylene diamine and mixtures thereof; perhydro-2,4'- and 4,4'-diaminodiphenylmethane; p-xylylene diamine; bis-(3-aminopropyl)-methylamine; diaminoperhydroanthracenes (German Auslegeschrift No. 2,638,731) and cycloaliphatic triamines (German Auslegeschrift No. 2,614,244). Hydrazine and substituted hydrazines (e.g. methyl hydrazine) may also be used.

Examples of aromatic diamines which are more suitable than aliphatic diamines but less preferred than the hydroxyl group-containing compounds include the diamines containing ether groups (German Auslegeschriften Nos. 1,770,525 and 1,809,172; U.S. Pat. Nos. 3,654,364 and 3,736,295; and German Offenlegungsschrift No. 2,948,419); 2-halogen-1,3-phenylene diamines optionally substituted in the 5-position (German Auslegeschriften No. 2,001,772; 2,025,896 and 2,065,869); 3,3'-dichloro-4,4'-diaminodiphenylmethane; the tolylene diamines; 2,4'- and/or 4,4'-diaminodiphenylmethane; 4,4'-diaminodiphenyl disulfides (German Auslegeschrift No. 2,404,976); diaminodiphenyldithioethers (German Auslegeschrift No. 2,509,404); aromatic diphenylsulfide diamines substituted by alkyl thio groups, such as 3,4'-diamino-3-ethyl-diphenylsulfide (German Auslegeschrift No. 2,638,760); aromatic diamines containing sulfonate or carboxylate groups (German Auslegeschrift No. 2,720,166) and high melting diamines (German Auslegeschrift No. 2,635,400). Aminoalkyl thioanilines (German Auslegeschrift No. 2,734,574) are examples of aliphatic-aromatic diamines.

The isocyanate compounds to be used in the process of the present invention may also be prepared from polyfunctional, organofunctional polysiloxanes having a relatively high molecular or low molecular structure, containing at least two terminal isocyanate reactive "H-active groups" and structural units of the formula —O—Si(R)$_2$ in which R denotes a C$_1$–C$_4$ alkyl group or a phenyl group (preferably a methyl group). These polysiloxanes are used as cocomponents in addition to the polyester polyols. Both pure siloxanes containing organofunctional end groups, which are known to those in the art, and siloxane polyoxyalkylene copolymers containing organofunctional groups in end positions, which are also known may be used as starting materials in the process of the present invention. Examples of organofunctional polysiloxanes which are suitable starting materials have been described in German Offenlegungsschriften Nos. 1,114,632; 1,190,176; 1,248,287 and 2,543,638; and in German Auslegeschriften Nos. 2,356,692; 2,445,648; 2,363,452; 2,427,273 and 2,558,523. The carbofunctional end groups are preferably aliphatic hydrocarbon residues with 1 to 6 carbon atoms containing at least one hydroxyl, mercapto, primary or secondary amino group and optionally containing hetero atoms such as oxygen.

Primary and secondary hydroxyl groups and primary and secondary amino groups are the preferred carbofunctional groups. Especially preferred are those starting compounds which have primary hydroxyl end groups. The carbofunctional groups may be present in the starting materials in, for example, the following form: —CH$_2$OH; —(CH$_2$)$_4$OH; —CH$_2$O—CH$_2$—CH$_2$—OH; —CH$_2$—S—CH$_2$—CH$_2$—OH; —CH$_2$—S—CH$_2$—CHOH—CH$_2$OH; —CH$_2$SH; —CH$_2$—S—CH$_2$—CH$_2$—SH; —CH$_2$—NH$_2$; —(CH$_2$)$_4$NH$_2$; —CH$_2$—NH—C$_4$H$_9$ or —CH$_2$—NH—C$_6$H$_{11}$.

The organofunctional polysiloxanes have at least 2, preferably 6 to 30 structural units of the formula —O—Si(R)$_2$ and molecular weights from 194 to 12000, preferably from 400 to 3000. As mentioned previously, the polysiloxanes used in the present invention may contain polyoxyalkylene units (in particular polyoxyethylene and/or polyoxypropylene units) in the chain in addition to the above-mentioned structures. The organofunctional polysiloxanes are obtainable by known processes.

The following compounds are examples of organofunctional polysiloxanes which are particularly suitable for purposes of the present invention:

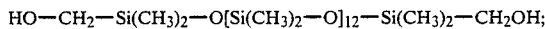

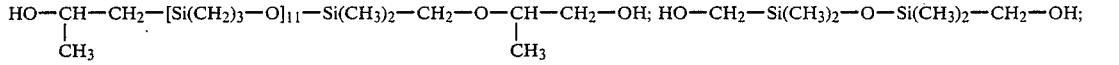

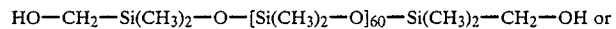

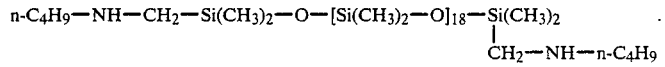

Organopolysiloxanes corresponding to the following general formula are particularly preferred:

$$\text{HO}-\text{CH}_2-\underset{\underset{\text{CH}_3}{|}}{\overset{\overset{\text{CH}_3}{|}}{\text{Si}}}-\left(\text{O}-\underset{\underset{\text{CH}_3}{|}}{\overset{\overset{\text{CH}_3}{|}}{\text{Si}}}\right)_n-\text{CH}_2-\text{OH} \quad n = 5 \text{ to } 29.$$

The isocyanate polyester prepolymers containing free aromatic isocyanate groups useful as starting materials in the process of the present invention may be prepared in known manner by reacting the components either solvent-free or in solution. The equivalent ratio of isocyanate groups to active hydrogen atoms (preferably obtained from OH groups) is in all cases greater than 1 and should generally be in the range of from 1.5:1 to 2.8:1 although a still larger excess of polyisocyanate may be used. The prepolymers generally have an oily to waxy consistency, depending upon the choice of starting components. If the NCO/OH ratio is higher than 2, the prepolymers obtained are substantially unlengthened, whereas NCO/OH ratios below 2 increase the average molecular weight of the prepolymer. It is also possible to include a certain proportion of low molecular polyol (molecular weight up to 399) as chain lengthening agent in addition to the relatively high molecular weight starting compounds for the preparation of the prepolymers. The isocyanate prepolymers obtained when such lengthening agents are used are also relatively high molecular weight products.

If products with a very low monomeric polyamine content or products which are virtually free from monomeric polyamines are to be produced by the process of the present invention, the isocyanate prepolymers may be subjected to distillation to remove the monomeric polyisocyanates. This may advantageously be carried out, for example, by means of a thin layer evaporator.

In one embodiment of the present invention, isocyanate prepolymers which have not been subjected to thin layer distillation or freed from monomers by some other method may also give rise to polyamines which are substantially free from monomeric polyamines, if hydrolysis is carried out in the presence of low molecular weight compounds containing hydroxyl, amino and/or other H-active groups (preferably low molecular weight diols).

Isocyanate compounds which are particularly preferred for the process of the present invention are the isocyanate prepolymers obtained from relatively high molecular weight polyesters (average molecular weight from 1000 to 4000) optionally with compounds containing isocyanate reactive groups ("active H atoms") and excess aromatic diisocyanates in an effective equivalent ratio of active H groups to NCO groups in the range of from 1:1.5 to 1:2.8, preferably from 1:1.5 to 1:2. Mixtures of various isocyanate prepolymers may also be used.

The average isocyanate content of the isocyanate prepolymer used is generally about 0.5 to 11.5 wt %, preferably from 1.7 to 7.2 wt %, most preferably from 2.2 to 6.5 wt %.

In the process of the present invention, primary aromatic polyamines containing urethane groups, polyester groups and optionally other groups typically present in isocyanates become available from isocyanate compounds containing free aromatic isocyanate groups, urethane groups and polyester groups and optionally other groups.

If the compounds containing free aromatic isocyanate groups used in the process of the present invention were prepared from a mixture of hydroxy esters and other compounds containing isocyanate reactive groups, then the products of the present invention contain free primary aromatic $NH_2$, urethane and polyester groups and may contain ether and/or acetal and/or carbonate and/or thioether and/or dialkylsiloxane groups and/or polybutadiene residues and optionally groups introduced by the aromatic polyisocyanate or by NCO reactions (e.g. urethane, biuret, allophanate, uretdione, carbodiimide, isocyanurate and/or amide groups and other groups).

If mixtures of aromatic isocyanate compounds containing aromatic urethane groups and polyester groups and other compounds containing aromatic isocyanate groups in addition to ether and/or acetal and/or carbonate and/or thioether and/or dialkylsiloxane groups and/or polybutadiene residues and/or urethane and/or biuret and/or allophanate and/or uretdione and/or isocyanurate and/or urea groups are used, the products obtained are mixtures of aromatic compounds containing primary $NH_2$, urethane and ester groups and other compounds which in addition to primary aromatic $NH_2$ groups contain ether and/or acetal and/or carbonate and/or thioether and/or dialkylsiloxane groups and/or biuret and/or allophanate and/or uretdione and/or isocyanurate and/or urea groups.

Additional groups may also be formed by side reactions, e.g. urea groups obtained by the reaction of already hydrolyzed isocyanate groups with fresh isocyanate compounds, or amide groups and hydroxyl groups obtained by the reaction of primary amino groups with ester groups. However, the latter side reaction is suppressed to a large extent in the process of the present invention.

The maximum quantity of aromatic $NH_2$ groups contained in the polyamines is equal to the quantity of isocyanate groups in the isocyanate compounds, i.e. about 0.17 to 3.83 wt %, preferably about 0.57 to 2.40 wt % $NH_2$.

In the process according to the invention, hydrolysis may generally be carried out without the addition of compounds containing active H atoms to the alkaline medium. The isocyanate compound used as starting component is generally used without solvent although solutions of isocyanate compounds (isocyanate prepolymers) in isocyanate inert solvents which are preferably also water-miscible may be used, e.g. to lower the viscosity. Suitable solvents for this purpose include: dimethoxyethane; diethylene glycol dimethylether; dioxane and tetrahydrofuran. Examples of less suitable solvents include aliphatic hydrocarbons, chlorinated aliphatic hydrocarbons and aromatic compounds, optionally chlorinated and/or nitrated. Such solvents are, however, preferably employed if the isocyanate compounds are solid isocyanate prepolymers or infusible, difficultly fusible or highly viscous isocyanate prepolymers at temperatures of about 20° to 80° C. If liquid isocyanate compounds are used without solvents in the process of the present invention, they are advantageously used at temperatures of from 20° to 80° C., preferably 40° to 70° C., in order to keep their viscosity low.

If isocyanate compounds are used in the form of solutions, the preferred temperature is from 20° to 40° C. although temperatures up to the boiling point of the solvent may be used. Where solutions of isocyanate compounds are used, they may be used at concentrations of from 1 to 400 parts of isocyanate prepolymer to 100 parts of solvent.

Mixing of the isocyanate compound with the alkaline medium should preferably be carried out at the lowest possible temperature in order to avoid side reactions as much as possible. The temperature in the reaction mixture should be as much below 100° C. as possible, preferably below 70° C. and most preferably below 40° C.

The temperature of the low viscosity alkaline medium is generally kept as low as possible even before the reaction (e.g. at −25° C. to 40° C., preferably 0° C. to 25° C.). Further cooling may be carried out during the reaction in order to maintain the reaction temperature at the optimum level. The appropriate reaction temperatures are dependent upon the particular method employed for mixing and the conditions under which the reaction is carried out.

The alkaline medium used for isocyanate hydrolysis in the present invention is generally an aqueous mixture or solution of bases. The minimum quantity of water used is that stoichiometrically necessary to have 1 mole of water for each mole of NCO.

Suitable basic materials are alkali metal hydroxides, alkaline earth metal hydroxides, low molecular weight alkali metal silicates and aluminates, and organic ammonium hydroxides (e.g. tetraalkylammonium hydroxides). Sodium hydroxide and potassium hydroxide are particularly preferred. The base may be used at a concentration of 1 part of base to 1–100 parts of water. If water-miscible solvents such as dioxane, tetrahydrofuran or dimethoxyethane are used, they may be used in quantities of from 10 to 1000 parts of cosolvent to 100 parts of water.

The reaction of the isocyanate compounds with the base(s) may be carried out by various methods.

In one discontinuous method, the compound containing isocyanate groups may be slowly introduced into the alkaline medium from a dropping funnel or by mechanical injection with a nozzle. The isocyanate compound should be uniformly distributed as far as possible by vigorous stirring. The time taken to introduce the isocyanate compound depends upon the heat of the reaction. Cooling may be necessary to ensure that the temperature of the reaction mixture generally does not exceed the temperature limit which in a discontinuous process is about 40° C., preferably 20° C. This temperature control is particularly important in the case of, for example, trifunctional and higher functional isocyanate prepolymers. A brief rise to a temperature of about 60° to 70° C. may be tolerated in the case of a difunctional prepolymer. The time taken to introduce the isocyanate compound into the alkaline medium is generally about 5 to 140 minutes, preferably from 30 to 120 minutes.

The ratio of the volume of the alkaline medium in the reaction vessel to the volume of liquid isocyanate to be introduced is normally in the range of about 1:1 to 1:3. This volume ratio does not apply if a solid isocyanate prepolymer is introduced in a solid, finely dispersed form.

In a continuous method which is particularly suitable for carrying out the present invention on a large scale, isocyanate compounds (optionally as a solution) and the aqueous base are measured separately into a common reaction chamber, vigorously mixed (e.g. by means of a continuous flow mixer) and thus brought to react. The reacted mixture is rapidly discharged from the mixing chamber. The components fed into the reaction vessel may be measured by means of graduated dropping funnels or a piston and/or membrane dosing pump or some other mechanical dosing apparatus. When dosing is carried out continuously, it is preferred to mix the two components within a very short time (seconds or fractions of seconds) by means of a suitable, optionally mechanically driven apparatus, react them together and discharge them from the reaction chamber. Suitable continuous flow mixers may be either static mixers with solid inserts or dynamic mixers with movable inserts operating on the rotor/stator principle. They may be heated or cooled if necessary. In static mixers, the energy required for mixing is provided by the pumps whereas in dynamic mixers the rotor is driven by a separate motor.

The rate of conversion of the isocyanate groups is dependent upon the power provided or the shearing forces produced, i.e. the degree to which the isocyanate compound is dispersed in the alkaline medium.

If a continuous flow mixer is used, the reaction components are generally supplied to the mixer at temperatures of about −25° C. to 60° C. Due to the shearing forces produced in a dynamic mixer and depending upon the heat of reaction produced, the reaction temperature may rise to about 50°–150° C. It is generally advisable, however, to maintain the temperature below 100° C., preferably below 80° C. (optionally by cooling the mixing apparatus).

If cosolvents are used, the reaction temperature should be maintained below the boiling point of the cosolvent if this is lower than the boiling point of water. The reactants are generally introduced into the continuous flow mixer in as low a viscosity form as possible and at as low a temperature as possible. The individual components may be heated or cooled to the required temperature. Due to the vigorous mixing, rapid reaction and discharge of the resulting reaction mixture, the temperature is not as critical in a continuous process as it is in a discontinuous process.

The proportion of equivalents of the alkali metal, alkaline earth metal and organic ammonium hydroxides (preferably used as bases) to isocyanate equivalents is generally in the range of from 0.3:1 to 2:1, based on one isocyanate equivalent. If the reaction is carried out continuously, solvents such as isopropanol or tertiary butanol may be used.

If a product which is not prelengthened or only slightly prelengthened by urea groups is to be obtained, it is preferred to employ an $OH^\ominus/NCO$ ratio of from 1.0:1 to 2:1, most preferably from 1.1:1 to 1.8:1, which means that an excess of base is left after all the isocyanate groups have been reacted. On the other hand, smaller quantities of base may be used if prelengthening of the polyamines through urea groups is acceptable or even desirable. An $OH^\ominus/NCO$ ratio in the range of from 0.3:1 to 1.0:1.0, preferably from 0.6:1 to 1.0:1.0, most preferably from 0.8:1 to 1:1.0 enables this reaction to be carried out smoothly. Higher or lower $OH^\ominus/NCO$ ratios may, of course, be employed, but if the ratio is less than 0.3:1, working up of the product becomes very tedious due to the high polymer character of the product. An $OH^\ominus/NCO$ ratio greater than 2:1, although possible, provides no practical advantages.

The total range of $OH^\ominus/NCO$ ratios for practical purposes is from 0.3:1 to 2:1, preferably from 0.6 to 1.8, and most preferably from 0.8 to 1.1. Various additives may be used to facilitate the reaction of the isocyanate groups with the aqueous base. Thus one or more commercial emulsifiers may be added in quantities ranging from 0.01 to 1 part by weight for each 100 parts of reaction mixture to facilitate homogenization.

Catalytically active compounds may also be used to increase the reaction velocity. Suitable catalysts include compounds containing tertiary amino groups such as those generally known in polyurethane chemistry and commonly used to accelerate the NCO-water reaction in the production of polyurethane foam.

Appropriate tertiary amines are triethylamine, tetramethylethylene diamine, tetramethylhexylenediamine, permethylated diethylenetriamine, permethylated triethylenetetramine, 1,4-diaza-2,2,2-bicyclooctane and bis-2-dimethylaminoethyl-ether. These compounds may be used in quantities of from about 0.01 to 10 wt %, based on the isocyanate.

After complete conversion of all the isocyanate groups, water or an organic water-miscible solvent may be added to the reaction mixture before further treatment. Suitable solvents of this kind include lower alcohols such as methanol, ethanol and isopropanol; and ethers such as tetrahydrofuran, dioxane and dimethoxyethane and diethylene glycol dimethylether.

In another embodiment of the present invention, compounds containing active H-atoms are added to the alkaline medium prior to hydrolysis. Compounds with "active H-atoms" and containing isocyanate reactive groups which may be added to the alkaline medium include any of those compounds containing hydroxyl or thiol groups or amino groups (less preferred) which compounds are generally referred to as chain lengthening or cross-linking agents. Less preferred are those compounds which have only one isocyanate reactive group containing reactive H-atoms, e.g. methanol, ethanol, propanols, utanols, hexanols, cyclohexanol, primary butylamines, hexylamines, cyclohexylamines, stearylamine, aniline and naphthylamines. Mixtures of various compounds containing H-active groups, optionally differing in their functionality, may also be used (e.g. mixtures of diols and triols or of diols and hydroxylamines).

If compounds containing H-active groups are used in the process of the present invention, they are preferably compounds containing hydroxyl groups. Di- to tetrafunctional compounds with a molecular weight of from 18 to about 399 are preferred while those with a molecular weight of from 62 to 250 are particularly preferred. Low molecular weight compounds with primary hydroxyl groups, such as ethanediol; 1,4-butanediol; 1,6-hexanediol; di-, tri- and tetra-ethyleneglycol; polyethylene glycols; N-methyl-diethanolamine; trimethylolethane; trimethylolpropane; addition compounds of ethylene glycol with, for example, trimethylolpropane, triethanolamine or pentaerythritol are especially useful.

The use of other organic solvents, preferably water-miscible solvents such as dioxane, tetrahydrofuran or dimethoxyethane, is possible but less preferred. Such cosolvents may be used in quantities of from 10 to 1000 parts cosolvent to 100 parts of water.

The reaction of the isocyanate compounds with the alkaline medium of water, base, compound containing "H-active groups" and optionally cosolvent may be carried out by any of the methods used when compounds containing active H-atoms are not included in the alkaline medium. These methods are described in detail below.

The structure of the products of the process of the present invention depends to a large extent upon the proportion of water:base:isocyanate reactive compounds and their proportion to the isocyanate compound. The products are also influenced by process parameters such as the speed of stirring.

If no compounds containing "H-active groups" are present in the alkaline medium, a base/NCO ratio of about 0.3-1 is appropriate. As the base/NCO ratio increases from 0.3 to 1, the number of urea units in the product amine diminishes and the structure progressively approaches that of the product obtained by complete conversion of all isocyanate groups into $NH_2$ groups.

It should be noted that formation of urea groups does not cease when the base/NCO ratio is $\geq 1$ because various factors (temperature, speed of stirrer, uneven distribution of base due to build-up of viscosity, etc.) cause urea units to be formed by side reaction even when the base/NCO ratio is $\geq 1$. Formation of urea units in this manner leads to prelengthening when isocyanate compounds free from monomers are used. However, when monomers are present in the isocyanate starting materials such side reactions lead mainly to the formation of low molecular weight urea compounds and also in some cases to amines prelengthened by way of urea units. In a discontinuous process, the base/NCO ratio at which formation of urea virtually ceases is approximately from 1.15-1.30. If one equivalent of compound containing "H-active groups" is used for each equivalent of base, almost every isocyanate group which is not converted into an $NH_2$ group reacts with an "H-active group" (e.g. an OH group). If an "H-active group"-containing compound is used, the quantity of compound containing "H-active groups" should be such that the ratio of the sum of equivalents of base and compounds containing "H-active groups" to the equivalents of isocyanate compound is preferably 1.15-1.30 or greater if urea formation is to be substantially avoided. The practical lower limit for the ratio of base to NCO compound is greater than or equal to 0.3 but a ratio of less than 0.3 may be used in some cases.

The quantity of compounds containing "H-active groups" added or the ratio of compounds containing "H-active groups" to base depends upon the nature of the isocyanate compounds used and the purpose for adding compounds containing "H-active groups". If, for example, in the preparation of an amine from an isocyanate prepolymer which still contains small residues of monomeric polyisocyanate (e.g. 1 to 2 wt %), it is intended to prevent the concomitant formation of low molecular weight polyamines (from this monomeric polyisocyanate), then the quantities of compounds containing "H-active groups" required will, of course, be less than in processes in which an isocyanate semi-prepolymer (i.e. a mixture of isocyanate prepolymer and excess quantities of free polyisocyanates) is to be converted into a mixture of several amines or when a trifunctional or higher functional aromatic polyamine is to be prepared from a linear diisocyanate compound by its reaction with trifunctional or higher functional compounds containing "H-active groups". Less of these compounds containing "H-active groups" will be required if only the functionality of the resulting aromatic amines is to be increased or reduced with respect to the underlying isocyanate compounds (e.g. an increase in functionality from 2.0 to 2.3). Generally, the ratio of equivalents of base to "H-active groups" ranges from 1:9.9 to 9:0.1, preferably from 1:4 to 9:1.

In all variations of the process of the present invention, substances required for a particular purpose may be added to the alkaline medium. These additives may include (generally soluble) antistatic agents, antifouling agents, agents required to render the substance hydrophobic, plasticizers, stabilizers, pigments, etc. Such additives are, however, preferably added after the alkaline medium has been mixed with the isocyanate compound.

In the process of the present invention, the compounds containing carbamate groups obtained by mixing the isocyanate compounds with the alkaline medium are directly converted into compounds containing amino groups. To obtain the amine, the reaction mixture containing the compounds carrying carbamate groups may be treated in several ways. In one method, the reaction mixture containing carbamate groups is treated with an at least equivalent quantity (based on the quantity of base put into the process) of a proton donor. The reaction mixture may also be heat treated or extracted with a solvent. Each of these three methods may be carried out either continuously or on a batch basis. In some cases, it may be advantageous to apply a vacuum to promote decomposition of the compounds containing carbamate groups. Further, these methods may also be combined.

Treatment of the reaction mixture containing carbamate groups, urethane groups, polyester groups and optionally other groups (hereinafter referred to as "carbamate mixture") with an at least equivalent quantity of a proton donor may be carried out using an acid fixed in an insoluble polymer skeleton (for example, an ion exchange resin) or a liquid or water-soluble mineral acid or organic acid. Use of both an acid fixed in an insoluble skeleton and a liquid acid is possible but not preferred. Such acid treatment may be carried out either on continuous or a batch basis.

The (acid) ion exchange resins useful as proton donors in the process of the present invention may be any substances which have mobile acidic hydrogen atoms in a polymeric insoluble structure. Particularly suitable polymeric acids are ion exchange resins which have, as their polymeric base, a styrene/divinylbenzene skeleton to which the sulfonic acid groups are attached as acid functions and ion exchange resins which have polymeric acrylic acid with COOH groups.

In the process of the present invention, it is immaterial whether the ion exchange resin is added to the carbamate mixture or the carbamate mixture is added to the resin. The ion exchange resin and carbamate mixture are combined to the extent allowed by the vigor of gas evolution and the size of the apparatus (10 to 300 minutes). This evolution of gas does not occur, however, until any excess alkali has been neutralized. If the two components are combined, little or no rise in temperature occurs. It is generally advantageous to adjust the temperature to within a range of 10° to 70° C., if necessary by external heating. Ion exchange resin should be added until no more gas evolves. Any carbon dioxide in solution may be expelled by brief heating to 60°–100° C. The quantity of hydrogen ions from the acid ion exchange resin used is equivalent to the quantity of alkali or in excess. It is preferable that from 1.01 to 1.8 equivalents of hydrogen ions for each alkali equivalent be used.

The reverse method in which the ion exchange resin is first put into the reactor, is preferred when the reaction data are already known and when the process is continuous. At the end point of the reaction, the reaction mixture is alkaline to the extent of the free amine content.

In a simple method for recovering the product amine, the liquid phase containing the liquid or dissolved amine and the charged ion exchange resin (solid phase) may be separated from one another by filtration. The charged ion exchange resin may then be washed with a suitable solvent (e.g. methanol, ethanol or dioxane) and combined with the first filtrate. After removal of any solvent from the filtrate by distillation (e.g. 17 mbar/100° C. and 0.1 to 1.3 mbar/100° C.), the product of the process remains behind as colorless to light yellow liquid or plastic or crystalline solid.

In a continuous process, a stationary arrangement of polymeric acid material such as a glass column filled with acid ion exchange resin is used. The carbamate mixture is forced under pressure and/or flowed under gravity through this column. The procedure may be repeated several times if necessary. The carbon dioxide should be discharged by suitable ventilation. When formation of the amine has been completed, this product is recovered e.g. by distillation. After decomposition of the carbamate mixture, the charged columns are washed (e.g. with methanol) and the washing phase may be combined with the product phase, if desired. After this extraction, the ion exchange resin may be regenerated by techniques known to those skilled in the art.

It is advantageous to use an "ion exchange battery" in which acidolytic decomposition, solvent extraction and regeneration of the material of the column may be carried out simultaneously in columns which may be separate or connected together.

Where a liquid or solid water-soluble organic or mineral acid is used, it is preferable to employ exactly equivalent quantities of acid (based on the total quantity of base). However, the acid may also be used in excess, as described in German Auslegeschrift No. 2,948,419.

The carbamate reaction mixture may be added dropwise to the liquid acid component. The acids used may be strong acids such as aqueous mineral acids like hydrochloric acid, sulfuric acid, dilute nitric acid and phosphoric acid. Strong organic acids such as oxalic acid, formic acid, acetic acid and similar strong organic acids may also be used. Hydrochloric acid and sulfuric acid are preferred, especially sulfuric acid. The acid is advantageously introduced at a temperature of from 0° C. to 20° C. into the reactor. The carbamate reaction mixture may then be added over a period of from 1 minute to 6 hours, preferably 30 minutes to 2 hours, and the temperature of the reaction mixture advantageously maintained below 25° C. by external cooling. The time required for addition of the carbamate depends upon the vigor of gas evolution.

The acid/base equivalent ratio is generally approximately 1:1, i.e. one equivalent of protons is used for each equivalent of base. Where approximately equivalent quantities of acid and base are used, the reaction mixture is approximately neutral to alkaline, as corresponds to the pH of a mixture of alkali metal salts or amine salts with an aromatic amino compound. Stirring of the reaction mixture is continued for 5 to 30 minutes at 20° C.

In the case of a liquid amino compound, the product may be worked up, by removing the volatile constituents from the whole reaction mixture by distillation (distillation e.g. at 15 to 700 Torr and 40° to 150° C. bath temperature), separating the precipitated salt constituents by filtration (e.g. using a heatable suction filter) and freeing the amine product from traces of volatile components (over a period of 2 hours at 0.013 to 20 mbar and 80° to 150° C.).

If the amino compound is a solid, it may be filtered off and if necessary purified by the usual methods, such as recrystallization or reprecipitation.

In a preferred method, the carbamate component and acid component are measured separately into a common reaction chamber, preferably at rates such that equal equivalents of base and acid reach the reaction chamber during the same time period so imbalances between the two reactants are substantially avoided. The appropriate temperature for carrying out this method is generally from 0° to 20° C. The reaction times may range from one minute to six hours but it is preferred to carry out this method on a continuous basis. If the method is carried out continuously, it is preferred that the two components be mixed within a very short time (seconds or fractions of a second) by means of a suitable mechanically driven apparatus. If the acid is used in excess, working up is carried out as described in German Auslegeschrift No. 2,948,419, i.e. the acid excess is neutralized with alkalies.

In a preferred method for treating the hydrolyzed mixture, hydrolysis of the carbamate groups into amino groups and salts of carbonic acid is brought about by heat treatment at temperatures up to about 200° C. Polyamines are formed from the compounds containing carbamate groups. The heat treatment may be carried out continuously or batchwise. It may be carried out with or without application of a vacuum.

In a batchwise method, the reaction mixture containing compounds with carbamate groups is heated for up to 360 minutes (preferably for 5 to 180 minutes, most preferably for 30 to 120 minutes) to temperatures of at least 40° C., preferably at least 60° C., most preferably at least 80° C. and at most to about 200° C., using a source of heat at a temperature of 60° to 200° C. (preferably 100° to 160° C.) such as steam or oil baths or conduction over heated plates. A temperature range of about 60° to 100° C., especially 80° to 100° C., is particularly suitable because it may be obtained by boiling excess water and any solvents present under reflux (optionally with application of a vacuum). It is also preferred to subject the carbamate mixture to heat treatment immediately after the hydrolysis has been completed in the same reaction vessel. Some carbon dioxide may escape in the course of this heat treatment, especially towards the end of the treatment.

This heat treatment gives rise to carbonic acid salts such as carbonates and bicarbonates of the alkalies used, possibly at various stages of hydration. Potassium bicarbonate $KHCO_3$, for example, may be formed.

If the solvent of the carbamate-containing reaction mixture which is subjected to the heat treatment is water or predominantly water with a minor proportion of an organic solvent or even a minor amount of water with a substantial proportion of a protic or aprotic-dipolar solvent (e.g. methanol, dimethylformamide) which has a high capacity for dissolving salts, then most of the carbonic acid salt will remain in solution. If the solvent of the reaction mixture containing carbamate groups which is subjected to the heat treatment only a minor amount of water and a large amount of solvent with a lower capacity for dissolving salt (e.g. n-butanol, i-butanol, tetrahydrofuran), then some carbonic acid salt may precipitate at this stage and be filtered off.

Solvent is distilled off after the heat treatment, either at normal pressure or under a vacuum (e.g. of 0.2 to 950 mbar). The reaction temperature depends upon the boiling point of the solvents and the proportions in which they are mixed but is generally from 80° to 100° C. When only minor residues of volatile substances are left, the temperature may be lowered to below 100° C. and a vacuum (e.g. of 0.01 to 6 mbar) applied.

Residues of water may be removed by the addition of a solvent which forms an azeotropic mixture with water (e.g. toluene) and renewed distillation, optionally at reduced pressure. The liquid distillation residue containing polyamines, which is at a temperature of 20° C. or more, preferably at 60° to 90° C. may be freed from the carbonic acid salt by filtration, centrifuging, decanting or similar methods. Removal of the carbonic acid salt is preferably carried out by means of a suction filter which may optionally be heated and operates under pressure, (e.g. an excess pressure of about 0.5 to 4 bar).

The filter residue, optionally after combination with other, similar filter residues, may be extracted with a suitable solvent capable of dissolving the amine and leaving the carbonic acid salt undissolved in order to recover small residues of amine product. Suitable solvents for this purpose include halogenated (in particular chlorinated) alkanes such as trichloromethane and liquid aromatic hydrocarbons such as toluene.

Variations of this batchwise heat treatment method are possible. For example, heat treatment of the carbamate mixture under conditions such that water and any other solvents present distill off. The reaction mixture containing carbamate groups may then be heated for about 30 to 480 minutes to temperatures of at least 40° C., preferably at least 60° C. and most preferably at least 80° C., using a source of heat at a temperature of 60° to 200° C., preferably 100° to 160° C., so that the solvent distills off during the heat treatment. This simultaneous heat treatment and distillation may also be carried out at reduced pressure, e.g. at 200 to 950 mbar. The pressure may be reduced gradually and continuously so that distillation may be begun at normal pressure and completed at about 0.5 mbar.

In another modification, a solvent is added before separation of the polyamine from the carbonic acid salt. This alternative may be advisable when the viscosity of the mixture which is to be suction filtered is too high or when the precipitated carbonic acid salts are too finely crystalline or when precipitation of the carbonic acid salts is incomplete. Suitable solvents include ethers such as dioxane, lower alkanes such as pentane or hexane, chlorinated hydrocarbons such as dichloromethane or trichloroethane, and lower aromatic compounds such as toluene and xylene. After the separation of salt and amine (e.g. by filtration) the solvent used is distilled from the amine solution. It is advantageous to use a solvent (e.g. toluene) which is capable of removing any residues of water by forming an azeotropic mixture.

In another modification of this heat treatment method, sub-equivalent quantities of acid (based on the alkaline equivalent put into the process, e.g. from 0.01 to 0.99 equivalents of acid based on one equivalent of alkaline compound) are mixed with the reaction mixture containing compounds with carbamate groups before and/or during heating. Suitable acids include e.g. sulfuric acid, hydrochloric acid, phosphoric acid and other acids which do not oxidize under the reaction conditions. Strong organic acids such as formic acid, chloroacetic acid, acetic acid and other acids which preferably have an acid strength at least equal to that of acetic acid may also be used.

After removal of the solvent by distillation, a mixture of carbonic acid salt and possibly sulfate, chloride, phosphate, etc. may be filtered off. For this operation, the temperatures and pressure may be varied within the limits indicated above and a suitable solvent may be added before the separation.

Carbon dioxide is advantageously introduced before or at the beginning of the heat treatment. This is particularly to be recommended when an $OH^\ominus/NCO$ ratio $\geqq 1$ was used. Excess base is in that case converted into a salt of carbonic acid.

In yet another modification of the heat treatment method, a compound which reacts with the base in a substantially anhydrous medium to form difficultly soluble salts may be added to the carbamate mixture (preferably before the heat treatment). This may be advantageous when preparing products which are soluble in aqueous or non-aqueous salts of carbonic acid and which are only slightly soluble in the solvents. The compounds used for this purpose, which form salts with bases, are preferably carboxylic acid esters, (e.g. methyl or ethyl esters of formic, acetic, propionic or benzoic acid) and they are preferably used in quantities such that all the hydroxide ions encounter a reactive compound (e.g. a compound carrying ester groups). A small excess is preferred but a larger excess may also be used. The conditions for the heat treatment and methods of working up are the same as for the other heat treatment processes discussed previously. Precipitation of the salts of carbonic acid is accompanied by the precipitation of carboxylic acid salts, e.g. acetates (when acetic acid esters are used), and when the product is worked up, the alcohol component is also distilled off.

Any of the treatment methods discussed above and their modifications may be carried out on a continuous basis. Continuous recovery of the polyamine is preferably carried out by heat treatment of the reaction mixture containing compounds with carbamate groups carried out after continuous preparation of the carbamate reaction mixture. In the continuous process, the aforesaid reaction, which has optionally been rendered fluid by the addition of diluents, is passed through a heating path. The temperature of the heating path and its size determine the duration of the heat treatment. The temperature of the heating path is chosen so that evaporation of the solvent takes place at least partially, preferably completely. This may be carried out at reduced pressure, e.g. at 0.5 to 950 mbar, preferably at 100 to 800 mbar. The temperature of the heating path may be from 60° to 200° C., preferably from 100° to 160° C. The temperature may vary at different points along the path but the carbamate mixture which is to be decomposed should (as far as possible) not be heated above 200° C. A thin layer evaporator, for example, is a simple form of such a heating path.

If the heating path does not contain filter devices or other measures for separating the salt components, the resulting amine/salt mixture may be separated by known methods such as those discussed above with respect to batchwise heat treatment.

Compounds containing carbamate groups may also be converted into the compounds containing amino groups (polyamines of the invention) by treating the reaction mixture containing them with a suitable solvent. Organic solvents suitable for this method, which are not miscible with water, include those solvents which do not dissolve the compounds containing carbamate groups or the carbonic acid salts formed but do dissolve the amines formed. Examples of such solvents include dichloromethane, trichloromethane, tetrachloromethane, cyclohexane, methyl cyclohexane, pentane, hexane, benzene and toluene. Dichloromethane is particularly suitable.

Such solvent is used in quantities of 10 to 1000 parts, preferably 20 to 500 parts, most preferably 80 to 150 parts, for each 100 parts of water present in the reaction mixture containing the compounds with carbamate groups. The treatment with solvent is preferably carried out at 20° to 40° C. but may be carried out at higher temperatures provided the temperature is not higher than the boiling point of the solvent used. The time required for treatment and extraction is generally from about one hour to 3 days, preferably 2 hours to 1 day at room temperature but is shorter at higher treatment temperatures. The end of the reaction can be detected by the fact that the aqueous and organic phase are optically clear and the organic phase no longer foams up when acid is added (ethanol, for example, may be added prior to the solvent to homogenize the organic phase and acid). The reaction mixture is preferably stirred during the treatment. When the reaction has been completed, the two phases may be separated mechanically and the organic phase freed from organic solvent by distillation. Residues of volatile substances are removed (e.g. at 0.1 mbar/100° C.).

Water-miscible solvents can in principle also be used if they have less dissolving power for salts of carbonic acid than water. Examples of such solvents include methanol; ethanol; n-propanol; i-propanol; n-butanol; i-amyl alcohol; cyclic ethers such as dioxane and tetrahydrofuran; water-soluble acylcic ethers such as diethylene glycol dimethylether; and ketones such as acetone and methyl ethyl ketone. A two phase system is again obtained after conversion of the compound containing carbamate groups into a polyamine. The carbonic acid salt is concentrated in the aqueous phase and the amine in the organic phase. However, because the two phases are miscible, the aqueous phase contains a certain amount of organic solvent and amine while the organic phase contains a certain amount of salt and water. Consequently, the organic phase must be filtered once more after removal of the solvent by distillation.

A mixture of several organic solvents could also be used. The solvents should preferably be chosen so that at least one solvent preferentially dissolves the compound containing carbamate groups as well as the amine while at least one other solvent preferentially dissolves only the amine. For example, lower alcohols may be used as the first mentioned solvent and chlorinated aliphatic hydrocarbons as the second solvent.

Extraction may be carried out at normal, reduced or excess pressure but normal pressure is preferred.

The process of extraction may be modified in that the reaction mixture containing compounds with carbamate groups may be mixed with subequivalent quantities of acids, (based on the quantity of base put into the process, i.e. about 0.01 to 0.99 equivalents of acid per 1 equivalent of base) either before or during the extraction. This modification is suitable, as is also the introduction of carbon dioxide, whenever the $OH^\ominus/NCO$ ratio used was greater than 1:1. The modifications of the heat treatment process previously discussed may also be used in the extraction treatment process.

Batchwise extraction may be carried out in conventional laboratory apparatus, e.g. by stirring the mixture with extraction solvents in a flask until optically clear phases are obtained and then transferring the phases to a separating funnel to be separated.

Extraction may also be carried out continuously. The usual extractors for liquid/liquid mixtures such as those obtainable for the use of extracting agents which are specifically heavier or lighter than the substance to be extracted may be used. If, for example, the solvent used is one which will not dissolve the compounds containing carbamate groups and forms a specifically lighter phase with the polyamine, the following procedure may be used. A reaction mixture containing carbamate groups is continuously introduced into a vessel. A solvent which dissolves the free amine is introduced into the vessel from below with stirring, removed from the extractor (e.g. through an overflow), freed from the amine by distillation and returned to the extractor. The specifically heavier solution, e.g. an aqueous salt solution, is discharged at the bottom, sodium hydroxide is added, the carbonic acid salt which thereupon crystallizes is removed and the solution is recycled for further reaction with isocyanate compounds.

The pure amine can easily be obtained from the organic amine solution in either the continuous or batchwise method by distillation of the solvent optionally carried out at reduced pressure. In many cases, however, recovery of pure amine by distillation is not necessary since for many purposes, e.g. the formation of coatings on textile fabrics, leather and other sheet products, amines are used in the form of solutions in an organic solvent. Where such uses are intended, it is advantageous to use a solvent which is also suitable for the subsequent use of the product.

The polyamines obtained by the process of the present invention are generally colorless to slightly colored, medium viscosity to high viscosity products possibly having fairly high melting points.

Due to the low vapor pressure of the modified or unmodified aromatic polyamines with urethane groups and polyester groups obtained by the process of the present invention, these products are preferably used as reactants for optionally blocked polyisocyanates in the production of polyurethanes (polyurethane ureas), including cellular and non-cellular polyurethane resins or polyurethane foams. These amines may also be combined with other low molecular weight compounds (molecular weight from 32 to 399) and/or relatively high molecular weight compounds (molecular weight from 400 to about 12000) containing isocyanate reactive groups. Suitable starting components for the production of polyurethane plastics have been described above in connection with the preparation of the prepolymers as well as in German Auslegeschriften Nos. 2,302,564; 2,432,764 (U.S. Pat. Nos. 3,903,679); 2,639,083; 2,512,385; 2,513,815; 2,550,796; 2,550,797; 2,550,833; 2,550,860 and 2,550,862. These disclosures also teach auxiliary agents and additives which may be used in the production of polyurethanes.

The polyamines prepared by the process of the present invention may be used to produce polyurethane (urea)s. These polyamines may be used as reactive components or reactive component mixtures for the reaction with polyisocyanates (e.g. for the production of elastomers, coatings or threads) for which they may be applied solvent-free or as solutions or dispersions. Other applications of the polyamines prepared according to the invention include their use as coupling components for diazo dyes and as hardeners for epoxide and phenol resins as well as their use in all other known reactions of amines, such as the formation of amides or imides.

The following Examples illustrate the process of the present invention. All parts and percentages given therein are parts and percentages by weight, unless otherwise indicated.

EXAMPLES

The following polyester polyols were used as hydroxyl group-containing polyesters for the preparation of the polyester isocyanate prepolymers containing isocyanate groups:

Polyester A

Diol of adipic acid, ethylene glycol and 1,4-butanediol (molar ratio ethylene glycol:1,4-butanediol=1:1), with an acid number of 0.4 and an OH number of 56.

Polyester B

Diol of adipic acid, ethylene glycol and 1,4-butanediol (molar ratio ethylene glycol:1,4-butanediol=4:7) with an acid number of 0.35 and an OH number of 56.

Polyester C

Diol of adipic acid, 1,6-hexanediol and neopentyl glycol (molar ratio 1,6-hexanediol:neopentyl glycol=11:6) with an acid number of 0.28 and an OH number of 65.

Polyester D

Diol of adipic acid and 1,4-butanediol with an acid number of 0.6 and an OH number of 124.

Polyester E

Diol of adipic acid and 1,6-hexanediol with an acid number of 0.5 and an OH number of 133.

Polyester F

Diol of azelaic acid, dipropylene glycol and 1,4-butanediol (molar ratio dipropylene glycol:1,4-butanediol=8:3) with an acid number of 0.15 and an OH number of 35.

Polyester G

Polyol of 1,6-hexanediol, trimethylolpropane and azelaic acid with a functionality of 2.3 and an OH number of 79.

Isocyanate prepolymers A–H

Isocyanate prepolymers were produced from each of the polyesters A to G and a mixture of 65% of 2,4-diisocyanatotoluene and 35% of 2,6-diisocyanatotoluene by reacting the polyester at 80° C. with the mixture of diisocyanatotoluenes at an OH:NCO ratio of 1:6. The isocyanate monomer was removed from the reacted mixture by distillation using a thin layer evaporator.

Isocyanate prepolymer A (prepared from polyester A) had an isocyanate value of 3.8 wt % (theoretical 3.58 wt %).

Isocyanate prepolymer B (prepared from polyester B) had an isocyanate value of 3.6 wt % (theoretical 3.58 wt %).

Isocyanate prepolymer C. (prepared from polyester C) had an isocyanate value of 4.1 wt % (theoretical 4.06 wt %).

Isocyanate prepolymer D (prepared from polyester D) had an isocyanate value of 7.0 wt % (theoretical 6.71 wt %).

Isocyanate prepolymer E (prepared from polyester E) had an isocyanate value of 7.1 wt % (theoretical 7.06 wt %).

Isocyanate prepolymer F (prepared from polyester F) had an isocyanate value of 2.4 wt % (theoretical 2.37 wt %).

Isocyanate prepolymer G (prepared from polyester G) had an isocyanate value of 3.75 wt % (theoretical 3.58 wt %).

Each of these isocyanate prepolymers were highly viscous oils at room temperature.

Isocyanate prepolymers H–Q

Isocyanate prepolymers were produced by reacting each of polyesters A–G and 2,4-diisocyanatotoluene at 80° C., using an OH:NCO ratio of 1:2.

Isocyanate prepolymer H (prepared from polyester A) had an isocyanate value of 3.8 wt % (theoretical 3.58 wt %).

Isocyanate prepolymer I (prepared from polyester B) had an isocyanate value of 3.7 wt % (theoretical 3.58 wt %).

Isocyanate prepolymer K (prepared from polyester C) had an isocyanate value of 4.3 wt % (theoretical 4.06 wt %).

Isocyanate prepolymer L (prepared from polyester D) had an isocyanate value of 6.9 wt % (theoretical 6.71 wt %).

Isocyanate prepolymer M (prepared from polyester E) had an isocyanate value of 6.9 wt % (theoretical 7.06 wt %).

Isocyanate prepolymer N (prepared from polyester F) had an isocyanate value of 2.6 wt % (theoretical 2.37 wt %).

Isocyanate prepolymer 0 (prepared from polyester G) had an isocyanate value of 3.6 wt % (theoretical 3.58 wt %).

Each of these isocyanate prepolymers were highly viscous to waxy compounds at room temperature.

Isocyanate prepolymers P-V

Isocyanate prepolymers were produced by reacting each of polyesters A–G with a mixture of 40% of 2,4'-diisocyanatodiphenylmethane and 60% of 4,4'-diisocyanatodiphenylmethane at 80° C., OH:NCO ratio of 1:2.

Prepolymer P (prepared from polyester A) had an isocyanate value of 3.6 wt % (theoretical 3.36 wt %).

Prepolymer Q (prepared from polyester B) had an isocyanate value of 3.6 wt % (theoretical 3.36 wt %).

Prepolymer R (prepared from polyester C) had an isocyanate value of 3.8 wt % (theoretical 3.78 wt %).

Prepolymer S (prepared from polyester D) had an isocyanate value of 6.1 wt % (theoretical 5.99 wt %).

Prepolymer T (prepared from polyester E) had an isocyanate value of 6.4 wt % (theoretical 6.26 wt %).

Prepolymer U (prepared from polyester F) had an isocyanate value of 2.2 wt % (theoretical 2.27 wt %).

Prepolymer V (prepared from polyester G) had an isocyanate value of 3.8 wt % (theoretical 3.36 wt %).

Isocyanate prepolymers W-Y

Isocyanate prepolymers were produced by reacting polyester polyol G with: (a) a mixture of 65 wt % of 2,4-tolylenediisocyanate and 35 wt % of 2,6-tolylenediisocyanate (isocyanate prepolymer W); (b) 2,4-diisocyanatotoluene (isocyanate prepolymer X); and (c) a mixture of 40% of 2,4'-diisocyanatodiphenylmethane and 60 wt % of 4,4'-diisocyanatodiphenylmethane (isocyanate prepolymer Y) at 80° C. and an OH/NCO ratio of 1:2.

Prepolymer W had an isocyanate value of 5.0 wt % (theoretical 4.76 wt %).

Prepolymer X had an isocyanate value of 4.9 wt % (theoretical 4.76 wt %).

Prepolymer Y had an isocyanate value of 4.5 wt % (theoretical 4.38 wt %). (Prepolymers P-Y are highly viscous or low melting waxes).

EXAMPLE 1

The carbamate was prepared by the following procedure: 304 g of a 50% KOH solution (2.72 mol KOH), 1.86 l of water and 2 g of Mersolat H ®* were introduced into the reaction vessel. The solution was cooled externally with an ice bath. 2 kg of prepolymer A which had been heated to 80° C. were added to the reaction vessel within 60 minutes. The temperature in the reaction vessel was maintained at 18°–23° C. and stirring was continued for 10 minutes at this temperature. Stirring was carried out vigorously both during the addition of the isocyanate prepolymer and for 10 minutes thereafter in order to prevent the precipitated carbamate from forming into lumps.

* Mersolat ® H is an emulgator (Bayer AG, D-509 Leverkusen)

The carbamate reaction mixture was then heated under reflux for 2 hours. Approximately half the water was then distilled off at 20 mbar and a bath temperature of 80° C. After the addition of 600 ml of toluene, distillation was continued at 20 mbar/80° C. and water and toluene distilled off. The amine end product was taken up with 800 ml of dichloromethane, and the carbonic acid salt was filtered off. The amine was freed from dichloromethane and traces of other volatile substances, first at 50° C./20 mbar and then at 80° C./2 mbar. The properties of the product amine are given in Table 1.

EXAMPLE 2

The carbamate was prepared by the following procedure:

205 g of a 45% sodium hydroxide solution (2.31 mol NaOH), 2 l of water and 2 g of Mersolat H ® were introduced into the reaction vessel. The solution was cooled externally with an ice bath. 2 kg (1.71 mol NCO) of prepolymer B (OH⊖:NCO ratio 1.35:1) preheated to 60° C. were added to the reaction vessel within 60 minutes. The temperature in the reaction vessel was maintained at 18°–22° C. and stirring was continued at this temperature for an additional 15 minutes. The reaction mixture was vigorously stirred during addition of the isocyanate prepolymer in order to prevent the precipitated carbamate from forming into lumps.

2 l of dioxane were then added to the carbamate reaction mixture. This mixture was introduced within 25 minutes into a mixture of 1.4 kg of sulfonic acid ion exchange resin Lewatit SC 108 ® (Bayer AG) and 250 ml of water. 35 l of $CO_2$ were liberated in the process (92% of the theoretical amount). After the reaction mixture had been stirred at 60° C. for 15 minutes to complete the reaction, the mixture was filtered and the solvent was distilled from the filtrate at 20 mbar/ 80° C. and 1.5 mbar/80° C. The properties of the product amine are given in Table 1.

EXAMPLE 3

The carbamate was prepared by the following procedure. 234 g of a 45% sodium hydroxide solution (2.63 mol NaOH), 100 ml of water and 3 l of dimethylformamide were introduced into the reaction vessel. This solution was cooled externally with an ice bath. 2 kg (1.95 mol NCO) of prepolymer C. (OH⊖:NCO ratio 1.35:1) preheated to 60° C. were added to the reaction vessel within 75 minutes. The temperature of the reaction mixture was maintained at 20°–25° C. The mixture was vigorously stirred during the addition of isocyanate prepolymer and during the 15 minutes after-stirring time.

The carbamate mixture (component A) was then introduced into a dropping funnel of suitable size. 2.63 kg of a 10% sulfuric acid (5.26 equivalents $H_2SO_4$) (component B) were introduced into another dropping funnel.

The two components were emptied into a reaction chamber containing 150 ml of water within 45 minutes at a rate such that equivalent amounts of sodium ions and protons met per unit time. At the same time the mixture was cooled to 25°–30° C. When 40 l of $CO_2$ (93% of the theoretical amount) had escaped, the reaction mixture was freed from volatile constituents at 80° C./20 mbar and 80° C./2 mbar. The viscous mixture remaining behind was mixed with 1.5 l of toluene and the salt which precipitated was suction filtered. The properties of the product amine are given in Table 1.

EXAMPLE 4

A carbamate was prepared by the following procedure. 100 g of a 50% potassium hydroxide solution (0.89 mol KOH), 400 ml of water and 0.75 g of Mersolat H ® were introduced into the reaction vessel. The solution was cooled externally with an ice bath. 354 g (0.59 mol NCO) of prepolymer D (OH⊖:NCO ratio 1.5:1) preheated to 40° C. were added within 20 minutes. The reaction temperature was maintained at 18° to 22° C. during this time and during the 15 minutes after stirring time. Vigorous stirring was constantly maintained to prevent the formation of lumps and settling of the smeary insoluble carbamate.

1.5 l of dichloromethane and 500 ml of toluene were added to this carbamate reaction mixture and the resulting two phase system was stirred for 6 hours at 30° C. After phase separation using a separating funnel of suitable dimensions, the organic phase was freed from volatile constituents by distillation (first at 20 mbar, then at 1 mbar/80° C.), and suction filtered (to remove traces of carbonic acid salt). The properties of the product amine are given in Table 1.

EXAMPLE 5

A carbamate was prepared by the following prodecure:

225 g of a 45% sodium hydroxide solution (2.54 mol NaOH), 1 l of water and 1 g of Mersolat H ® were introduced into the reaction vessel. This solution was cooled with an ice bath. 1 kg (1.69 mol) of prepolymer E (OH⊖:NCO equivalent ratio 1.5:1) heated to 60° C. was added within 40 minutes. The reaction temperature was maintained at 24°–28° C. during this time and during the 30 minutes after-stirring time. Vigorous stirring was maintained to prevent the carbamate from sticking and settling.

1 l of dimethylformamide was added to the carbamate reaction mixture and the mixture was heated to 80° C. for one hour. From the two phase system which formed on cooling, the lower (amine phase) was freed from solvent by distillation at 15 mbar/80° C., taken up with 450 ml of dichloromethane and suction filtered. The solvent was distilled off at 20 mbar/80° C., and 1.5 mbar/80° C. The properties of the product amine are given in Table 1.

EXAMPLE 6

A carbamate was prepared by the following procedure:

61 g of 45% sodium hydroxide solution (0.69 mol NaOH), 1 l of water and 1 g of Mersolat H ® were introduced into the reaction vessel. This solution was cooled by means of an ice bath. 1 kg (0.57 mol NCO) of prepolymer F (OH⊖:NCO equivalent ration 1.2:1) preheated to 60° C. was added within 40 minutes. During this time and for 30 minutes thereafter, the reaction temperature was maintained at 20°–25° C. and the mixture was vigorously stirred. Amine was produced from this carbamate by the same process as was used to prepare the amine in Example 1. The properties of the product amine are given in Table 1.

EXAMPLE 7

A carbamate was produced by the following procedure:

600 g of a 50% potassium hydroxide solution (5.36 mol KOH), 3 g of Mersolat H ® and 3.5 kg of water were introduced into the reaction vessel. This solution was cooled externally with an ice bath. 4 kg of isocyanate prepolymer G (at 60° C.) were added with very Vigorous stirring within one hour (3.57 mol NCO; OH⊖:NCO equivalent ratio 1.5:1). During this addition and for 15 minutes thereafter, the temperature was maintained at 16° to 26° C.

The carbamate reaction mixture was stirred for 5 hours at 80° C. and the solid carbamate phase was then separated by filtration. The solid product was taken up with 800 ml of toluene and the residual water was removed by distillation. The product was taken up with 2.5 l of dimethylformamide (with heating) and freed from the salt residues. The dimethylformamide was distilled off. The properties of the product amine are given in Table 1.

TABLE 1

| Example | 1 | 2 | 3 | 4 | 5 | 6 | 7 |
|---|---|---|---|---|---|---|---|
| Yield (%) | 96 | 93 | 94 | 94 | 98 | 98 | 89 |
| Primary nitrogen (%)[1] | 1.04 | 1.14 | 1.07 | 1.85 | 2.00 | 0.57 | 1.13 |
| NH number[2] (mg KOH/g) | 41.06 | 45.6 | 42.8 | 74.0 | 80 | 22.8 | 45.2 |
| NH number[3] (mg KOH/g) | 44.0 | 48.0 | 46.3 | 81.3 | 81 | 27 | 44.9 |
| Total nitrogen[4] (%) | 2.49 | 2.38 | 2.76 | 4.70 | 4.66 | 1.50 | 2.53 |
| Acid number (mg KOH/g) | 0.05 | 0.05 | 0.35 | 0.18 | 0.10 | 0.1 | 0.1 |
| Water content[5] (%) | 0.12 | 0.07 | 0.08 | 0.15 | 0.3 | 0.05 | 0.04 |

[1] Titration with HClO$_4$
[2] calculated from [1]
[3] by pyridine/acetic anhydride determination
[4] according to Dumas
[5] according to Karl Fischer

EXAMPLE 8

A carbamate was prepared by the following procedure:

284 g of a 50% potassium hydroxide solution (2.53 mol of KOH), 2 l of water and 2 g of Mersolat H ® were introduced into the reaction vessel. The solution was cooled externally with an ice bath. 2 kg of isocyanate prepolymer H (1.81 mol NCO) preheated to 50° C. were added within 60 minutes (OH⊖:NCO equivalent ratio 1.4:1). During this addition and for 10 minutes thereafter, the reaction temperature was maintained at 18°–23° C. and the mixture was vigorously stirred. The amine was then obtained by the same procedure described in Example 1. The properties of the product amine are given in Table 2.

EXAMPLE 9

A carbamate was produced by the following procedure:

237 g of a 50% potassium hydroxide solution (2.11 mol KOH), 2 l of water and 2 g of Mersolat H ® were introduced into the reaction vessel. The solution was cooled externally with an ice bath. 2 kg of isocyanate prepolymer I (1.76 mol NCO) preheated to 55° C. were added within 60 minutes (OH⊖:NCO equivalent ratio 1.2:1). The reaction temperature was maintained at 18°–25° C. and the mixture vigorously stirred during the time of addition and for 20 minutes thereafter. The amine was obtained by treating the carbamate mixture in the same manner as was described in Example 1. The properties of the product amine are given in Table 2.

EXAMPLE 10

A carbamate was produced by the following procedure. 273 g of a 45% sodium hydroxide solution (3.07 mol NaOH), 2 l of water and 2 g of Mersolat H ® were introduced into the reaction vessel. This solution was cooled externally with an ice bath. 2 kg of isocyana-te prepolymer K (2.05 mol NCQ) were added with vigorous stirring while the reaction temperature was maintained at 20°-26° C. (OH⊖:NCO equivalent ratio=1.5:1). Stirring was then continued at this temperature for 30 minutes. The amine was obtained by treating the carbamate mixture in the same manner as described in Example 1. The properties of the product amine are given in Table 2.

EXAMPLE 11

A carbamate was prepared by the following procedure:

460 g of a 50% potassium hydroxide solution (4.11 mol KOH), 1.8 l of water and 3 g of Mersolat H ® were introduced into the reaction vessel. This aqueous mixture was cooled externally with an ice bath. 2 kg of isocyanate prepolymer L (40° C.) (3.29 mol NCO) were added within 50 minutes under conditions of vigorous stirring and with the reaction temperature maintained at 20°-26° C. (OH⊖:NCO equivalent ratio 1.25:1). Stirring was then continued at this temperature for 20 minutes. The amine was obtained by treating the carbamate mixture in the same manner as described in Example 1. The properties of the product amine are given in Table 2.

EXAMPLE 12

A carbamate was prepared by the following procedure:

460 g of a 50% potassium hydroxide solution (4.11 mol KOH), 2.3 l of water and 2.5 g of Mersolat H ® were introduced into the reaction vessel. This aqueous solution was cooled externally with an ice bath. 2 kg of isocyanate prepolymer M (3.29 mol NCO) were added within 35 minutes with vigorous stirring and at a reaction temperature maintained at 23°-26° C. (OH⊖:NCO equivalent ratio 1.25:1). Striring was then continued at this temperature for 15 minutes. The amine was obtained by treating the carbamate mixture in the same manner as described in Example 1. The properties of the product amine are given in Table 2.

EXAMPLE 13

A carbamate was produced by the following procedure:

A mixture of 222 g of a 50% potassium hydroxide solution (1.98 mol KOH), 2.1 l of water and 2 g of Mersolat H ® was introduced into the reaction vessel and cooled externally with an ice bath. 2 kg of isocyanate prepolymer N (1.24 mol NCO) preheated to 70° C. were added with vigorous stirring within 60 minutes (OH⊖:NCO equivalent ratio 1.6:1). Stirring was then continued for 20 minutes at this temperature. The amine was obtained by treating the thus-produced carbonate mixture in accordance with the procedure described in Example 1. The properties of the product amine are given in Table 2.

EXAMPLE 14

A carbamate was produced by the following procedure:

A mixture of 288 g of 50% potassium hydroxide solution (2.57 mol KOH), 2 l of water and 2 g of Mersolat H ®, was introduced into the reaction vessel and cooled externally with an ice bath. 2 kg of isocyanate prepolymer O (1.71 mol NCO) which had been heated to 75° C. were added within one hour with vigorous stirring while the reaction temperature was maintained at 22°-30° C. (OH⊖:NCO equivalent ratio 1.5:1). Stirring was then continued for 15 minutes at this temperature. The amine was obtained by treating the thus-produced carbamate mixture in accordance with the procedure described in Example 7. The properties of the product amine are given in Table 2.

TABLE 2

| Example | 8 | 9 | 10 | 11 | 12 | 13 | 14 |
| --- | --- | --- | --- | --- | --- | --- | --- |
| Yield (%) | 88 | 91 | 98 | 94 | 97 | 99 | 99 |
| Primary nitrogen[1] (%) | 1.19 | 0.99 | 1.23 | 1.98 | 1.88 | 0.80 | 1.00 |
| NH number[2] (mg KOH/g) | 47.6 | 39.6 | 49.2 | 79.2 | 75.2 | 32 | 38.3 |
| NH number[3] (mg KOH/g) | 50.1 | 45.5 | 50.9 | 84.4 | 79.0 | 33.1 | 39.0 |
| Total nitrogen[4] (%) | 2.50 | 2.40 | 2.76 | 4.66 | 4.49 | 1.50 | 2.46 |
| Acid number (mg KOH/g) | <0.05 | 0.1 | 0.1 | 0.2 | 0.16 | 0.12 | 0.1 |
| Water content[5] (%) | 0.3 | 0.25 | 0.09 | 0.1 | 0.1 | 0.1 | 0.18 |

[1-5]Same as in Table 1

EXAMPLE 15

The carbamate reection mixture was made from the same materials used in the same amounts by the procedure described in Example 8. This carbamate mixture was mixed with 2 l of dimethylformamide and the mixture (component A) was introduced into a dropping funnel of suitable size.

923.5 ml of a 10% hydrochloric acid (component B) were introduced into another dropping funnel.

Both components were emptied into a reaction chamber containing 150 ml of water as stirring medium over a period of 50 minutes at a rate such that equivalent quantities of sodium ions and protons met per unit time. At the same time, the temperature was maintained at 25°-30° C. by cooling. When 34.3 l of $CO_2$ (85% of the theoretical amount) had been liberated, the aqueous phase containing the major proportion of salt was separated from the resulting two phase system and discarded. The organic phase was concentrated by evaporation at 80° C./20 mbar, taken up with 1.5 l of dioxane and suction filtered. The solution in dioxane was freed from dioxane and residues of other volatile constituents at 20 mbar/80° C. and then at 1 mbar/80° C. The properties of the product amine are given in Table 3.

EXAMPLE 16

The carbamate was produced from the same materials used in the same amounts by the procedure described in Example 9. 2.5 l of acetonitrile were stirred into the carbamate reaction mixture. 2 kg of acid ion exchange resin SPC 118 ® (sold by Bayer) were added in small portions over a period of 90 minutes at 40°-45° C. 38 l of $CO_2$ (96% of the theoretical amount) were liberated. After the reaction mixture had been heated at 60° C. for 25 minutes to complete the reaction, the mixture was filtered and the solvent was distilled from the amine filtrate, first at 20 mbar/80° C. and then at 1.5

EXAMPLE 17

The carbamate was prepared from the same materials used in the same amounts by the same procedure described in Example 10. This carbamate mixture was then subjected to the same treatment as in Example 15 with the exception that instead of hydrochloric acid, 184.2 g of anhydrous acetic acid were used, and 41.8 l of $CO_2$ (91% of the theoretical amount) were liberated. The properties of the product amine are given in Table 3.

EXAMPLE 18

The carbamate was prepared by repeating the procedure described in Example 11. The carbamate was then treated in accordance with the procedure described in Example 15 with the exception that instead of hydrochloric acid, 2.22 kg of a 10% ortho-phosphoric acid were used, and 69 l of $CO_2$ (95% of the theoretical amount) were liberated. The properties of the product amine are given in Table 3.

EXAMPLE 19

The carbamate was prepared by repeating the procedure described in Example 12. This carbamate was then treated in accordance with the procedure described in Example 15 with the exception that instead of hydrochloric acid, 189.1 g of anhydrous formic acid were used, and 73 l of $CO_2$ (100% of the theoretical amount) were liberated. The properties of the product amine are given in Table 3.

EXAMPLE 20

The carbamate was prepared by repeating the procedure described in Example 13. This carbamate was then treated in accordance with the procedure described in Example 16 with the exception that instead of SPC 118 ®, 2.5 kg of acid ion exchange resin CNP 80 (sold by BAYER) were used. 25 l of $CO_2$ (90% of the theoretical amount) were liberated. The properties of the product amine are given in Table 3.

EXAMPLE 21

The carbamate was prepared by repeating the procedure described in Example 14. 1 l of dimethylformamide and 2 l of acetonitrile were added to the carbamate reaction mixture. 3 kg of acid ion exchange resin SP 108 (sold by BAYER) were added in portions to this reaction mixture. 60 l of $CO_2$ (94% of the theoretical amount) were liberated at a reaction temperature of 40°–45° C. The charged ion exchange resin was filtered off and the amine filtrate was freed from solvent at 100° C./20 mbar and then at 80° C./2 mbar. Another 500 ml of toluene were then added and distillation was again carried out, first at 20 mbar/100° C. and then at 1.5 mbar/80° C. The properties of the product amine are given in Table 3.

The ion exchange resins SPC-118; CNP-80; SC-108; SP-108 and Lewatit M 500 are all manufactured by BAYER AG - D-509 Leverkusen.

TABLE 3

| Example | 15 | 16 | 17 | 18 | 19 | 20 | 21 |
|---|---|---|---|---|---|---|---|
| Yield (%) | 94 | 92 | 93 | 98 | 90 | 98 | 98 |
| Primary nitrogen (%)[1] | 1.14 | 1.00 | 1.29 | 2.11 | 1.99 | 0.69 | 1.07 |
| NH number[2] (mg KOH/g) | 45.6 | 40 | 51.6 | 84.4 | 79.6 | 27.6 | 42.8 |
| NH number[3] (mg KOH/g) | 47.0 | 40.9 | 57.1 | 89.7 | 90.9 | 32.0 | 43.1 |
| Total nitrogen[4] (%) | 2.50 | 2.50 | 2.75 | 4.67 | 4.60 | 1.79 | 2.43 |
| Acid number (mg KOH/g) | 0.38 | 0.09 | 0.6 | 0.65 | 0.7 | 0.09 | 0.12 |
| Water content[5] (%) | 0.05 | 0.05 | 0.35 | 0.4 | 0.19 | 0.23 | 0.09 |

[1-5]Same as in Table 1

EXAMPLE 22

A carbamate was prepared by the following procedure:

A mixture of 287.8 g of a 50% potassium hydroxide solution (2.57 mol KOH), 2 l of water, 2 g of Mersolat H ® and 1 l of dioxane was introduced into the reaction vessel and cooled with an ice bath. 2 kg of isocyanate prepolymer P (1.71 mol NCO) heated to 65° C. were added with vigorous stirring over a period of 75 minutes ($OH^\ominus$:NCO equivalent ratio 1.5:1). Stirring was then continued for 45 minutes at this temperature.

2.5 l of toluene were added to the thus-produced carbamate and the resulting mixture was heated to 100° C. for one hour. The solvent was then distilled off at 80° C./20 mbar. The residue was again taken up with 500 ml of toluene and the solvent was again distilled off, first at 80° C./20 mbar and then at 80° C./2 mbar. The amine product (which was at a temperature of 80° C.) was freed from the carbonic acid salt by filtration. The properties of the product amine are given in Table 4.

EXAMPLE 23

A carbamate was prepared by the following procedure:

A mixture of 268 g of a 50% potassium hydroxide solution (2.4 mol KOH), 2 l of water and 1 l of dimethoxyethane was introduced into the reaction vessel and cooled with an ice bath. 2 kg of isocyanate prepolymer Q (1.71 mol NCO) heated to 60° C. were added with vigorous stirring over a period of 75 minutes ($OH^\ominus$:NCO equivalent ratio 1.4:1). Stirring was then continued at this temperature for 60 minutes. The amine was produced from this carbamate by the same procedure used in Example 22. The properties of the product amine are given in Table 4.

EXAMPLE 24

A carbamate was produced by the following procedure:

A mixture of 243 g of a 50% potassium hydroxide solution (2.17 mol KOH), 2 l of water and 1.5 l of acetonitrile was introduced into the reaction vessel and cooled externally with an ice bath. 2 kg of isocyanate prepolymer R (1.81 mol NCO) heated to 60° C. were added over a period of 75 minutes with vigorous stirring while the reaction temperature was maintained at 20°–25° C. ($OH^\ominus$:NCO equivalent ratio 1.2:1). Stirring was continued for 45 minutes at this temperature. The amine was obtained by treating this carbamate in accordance with the procedure described in Example 22. The properties of the product amine are given in Table 4.

EXAMPLE 25

A carbamate was prepared by the following procedure:

A mixture of 423 g of a 45% sodium hydroxide solution (3.78 mol NaOH), 1.5 l of water and 3 l of tetrahydrofuran was introduced into a reaction vessel and cooled with an ice bath. 2 kg of isocyanate prepolymer S (2.9 mol NCO) heated to 65° C. were added over a period of 90 minutes with vigorous stirring while the reaction temperature was maintained at 18°–27° C. (OH$^\ominus$:NCO ratio 1.3:1). Stirring was then continued at this temperature for 45 minutes.

The carbamate mixture thus-obtained (component A) was introduced into a suitable dropping funnel.

378 g of a 50% sulfuric acid (component B) were introduced into another dropping funnel.

Both components were dosed into a reaction chamber containing 1 l of tetrahydrofuran over a period of 50 minutes at a rate such that equivalent quantities of sodium ions and protons were introduced per unit of time. 61 l of $CO_2$ (94% of the theoretical amount) evolved. The temperature of the reaction chamber was maintained at 20°–35° C. by external cooling. Stirring was continued for 10 minutes at 25° C. after evolution of $CO_2$ had been completed. 15 ml of alkaline ion exchanger Lewatit M 500 ® (sold by BAYER) were added, the reaction mixture was filtered and the solvent was distilled off, first at 80° C./20 mbar and then at 80° C./1 mbar. The product mixture which was at a temperature of 80° C. was freed from salt by filtration. The properties of the product amine are given in Table 4.

EXAMPLE 26

A carbamate was prepared by the following procedure:

A mixture of 393 g of a 45% sodium hydroxide solution (4.42 mol NaOH), 2 l of water, 1 g of Mersolat H ® and 1 l of dimethylformamide was introduced into a reaction vessel and cooled externally with an ice bath. 2 kg of isocyanate prepolymer T (3.05 mol NCO) heated to 40° C. were added over a period of 80 minutes with vigorous stirring while the reaction temperature was maintained at 20°–25° C. (OH$^\ominus$:NCO equivalent ratio 1.45:1). Stirring was continued for an additional 30 minutes at this temperature. The amine was obtained from this carbamate mixture by the same procedure as was used in Example 25. The properties of the product amine are given in Table 4.

EXAMPLE 27

A carbamate was prepared by the following procedure:

A mixture 152 g of a 50% potassium hydroxide solution (1.36 mol KOH), 2 l of water, 1 g of Mersolat H ® and 1 l of dimethylformamide was introduced into the reaction vessel and cooled externally with an ice bath. 2 kg of isocyanate prepolymer U (1.05 mol NCO) heated to 70° C. were added over a period of 60 minutes with vigorous stirring while the reaction temperature was maintained at 28°–33° C. (OH$^\ominus$:NCO equivalent ratio 1.3:1). Stirring was then continued for 35 minutes at this temperature. The amine was obtained from this carbamate mixture by treating the carbamate in accordance with the procedure described in Example 25. The properties of the product amine are given in Table 4.

EXAMPLE 28

A carbamate was prepared by the following procedure:

A mixture of 152 g of a 50% potassium hydroxide solution (1.36 mol KOH), 2 l of water, 1 g of Mersolat H ® and 2 l of dioxane was introduced into the reaction vessel and cooled externally with an ice bath. 2.5 kg of a mixture heated to 70° C. of 1 kg of prepolymer V and 1.5 kg of dioxane (0.9 mol NCO) were added over a period of 60 minutes with vigorous stirring while the reaction temperature was maintained at 28°–35° C. (OH$^\ominus$:NCO equivalent ratio 1.5:1). Stirring was then continued at this temperature for 35 minutes. This carbamate mixture was then treated in accordance with the procedure described in Example 25 to obtain the amine. The properties of the product amine are given in Table 4.

TABLE 4

| Example | 22 | 23 | 24 | 25 | 26 | 27 | 28 |
|---|---|---|---|---|---|---|---|
| Yield (%) | 94 | 93 | 96 | 97 | 91 | 90 | 89 |
| Primary nitrogen (%)[1] | 1.06 | 1.00 | 0.94 | 1.86 | 2.00 | 0.55 | 1.02 |
| $NH_2$ number[2] (mg of KOH/g) | 42.4 | 40 | 37.6 | 74.4 | 80 | 22 | 40.8 |
| NH number[3] (mg KOH/g) | 46.3 | 48.1 | 43.6 | 80.2 | 83.1 | 24.3 | 48.6 |
| Total nitrogen[4] (%) | 2.35 | 2.47 | 2.48 | 4.10 | 4.11 | 1.40 | 2.37 |
| Acid number (mg KOH/g) | 0.1 | 0.12 | 0.09 | 0.28 | 0.34 | 0.50 | 0.38 |
| Water content[5] (%) | 0.06 | 0.14 | 0.28 | 0.31 | 0.11 | 0.08 | 0.07 |

[1]–[5]Same as in Table 1

EXAMPLE 29

A carbamate was produced by the following procedure:

582 g of a 45% sodium hydroxide solution (6.55 mol NaOH), 5 l of water, 4.5 g of Mersolat H ® and 5 l of dimethylformamide were introduced into a reaction vessel. The solution was cooled externally with an ice bath. 5 kg of isocyanate prepolymer W (5.95 mol NCO) heated to 75° C. were added over a period of 60 minutes (OH$^\ominus$:NCO equivalent ratio 1.1:1). The reaction temperature was maintained at 20°–25° C. The reaction mixture was vigorously stirred during addition of the isocyanate prepolymer and for 45 minutes thereafter.

2 kg of the carbamate reaction mixture were heated to 35°–40° C. and 0.5 kg of moist ion exchange resin Lewatit SC 108 ® were added over a period of 30 minutes. 16 l of $CO_2$ (94% of the theoretical amount) evolved. After the reaction mixture had been heated for 15 minutes at 60° C. to complete the reaction, it was filtered and the solvent was removed from the amine filtrate by distillation at 20 mbar/80° C. and 1 mbar/80° C. The properties of the product amine are given in Table 5.

EXAMPLE 30

2 kg of the carbamate reaction mixture obtained in Example 29 were heated to 80°–90° C. for 45 minutes and then freed from solvent at 80° C./20 mbar. When the product had been cooled to 50° C., 1 l of toluene was added, 500 ml of toluene were distilled off at 80° C./20 mbar and the residue was filtered. The filtrate was freed from solvent at 80° C./20 mbar and 80° C./1 mbar. The properties of the product amine are given in Table 5.

EXAMPLE 31

2 kg of the carbamate reaction mixture obtained in Example 29 were introduced into a dropping funnel of suitable size (component A). Another dropping funnel contained 82.8 g of 50% sulfuric acid (0.845 equivalents of sulfuric acid) (component B).

Components A and B, each at room temperature, were introduced into a reaction chamber containing 100 ml of water (as stirring medium) at a rate such that equivalent quantities of sodium ions and protons met in the reaction chamber. 17 l of $CO_2$ (100% of the theoretical amount) were liberated. A reaction temperature of 30°–35° C. was maintained in the reaction vessel. The aqueous phase was separated from the two phase system which formed. The organic phase was freed from solvent at 80° C./20 mbar, filtered off, again mixed with 500 ml of toluene, again filtered, and then distilled at 80° C./20 mbar and 80° C./2 mbar. The properties of the product amine are given in Table 5.

EXAMPLE 32

A carbamate was prepared by the following procedure:

290 g of a 45% sodium hydroxide solution (3.26 mol NaOH), 0.5 l of water, 2 g of Mersolat H ® and 2 l of dioxane were introduced into a reaction vessel. This mixture was cooled externally with an ice bath. 2 kg of isocyanate prepolymer X (2.33 mol NCO) heated to 65° C. were added over a period of 60 minutes (OH⊖:NCO equivalent ratio 1.4:1). A reaction temperature of 23°–28° C. was maintained. Stirring was then continued for 30 minutes.

The carbamate mixture was heated to 100° C. for 45 minutes. The aqueous phase was separated after cooling. The organic phase was freed from solvent by distillation at 20 mbar/80° C. and the residue taken up with 1 l of toluene. After filtration, toluene and other volatile constituents were distilled off at 80° C./20 mbar and 80° C./2 mbar. The properties of the product amine are given in Table 5.

EXAMPLE 33

A carbamate was prepared by the following procedure:

146.5 g of a 45% sodium hydroxide solution (1.64 mol NaOH), 2 l of water, 2 g of Mersolat H ® and 2 l of dioxane were introduced into a reaction vessel. This mixture was cooled externally with an ice bath. 2 kg of isocyanate prepolymer Y (2.14 mol NCO) heated to 75° C. were added with vigorous stirring over a period of 60 minutes (OH⊖:NCO equivalent ratio 1:1.3). The reaction temperature was maintained at 20°–25° C. Stirring was then continued for 30 minutes.

The carbamate mixture was heated to 80° C. for 2 hours and 1 l of toluene was then added. The aqueous phase which formed was separated off. The organic phase was freed from solvent by distillation at 20 mbar/80° C. and the residue cooled to room temperature was taken up with 2 kg of dichlormethane. The residues of salt were filtered off and the dichloromethane was again distilled off, first at 20 mbar/50° C. and then at 1 mbar/80° C. The properties of the product amine are given in Table 5.

TABLE 5

| Example | 29 | 30 | 31 | 32 | 33 |
|---|---|---|---|---|---|
| Yield (%) | 99 | 90 | 85 | 85 | 94 |
| Primary nitrogen[1] (%) | 1.50 | 1.37 | 1.53 | 1.23 | 1.32 |
| NH number[2] (mg of KOH/g) | 60 | 54.8 | 61.2 | 49.2 | 52.8 |
| NH number[3] (mg of KOH/g) | 63.9 | 64.4 | 62.4 | 52.7 | 60.0 |
| Total nitrogen[4] (%) | 3.30 | 3.37 | 3.20 | 3.19 | 2.91 |
| Acid number (mg of KOH/g) | 0.18 | 0.09 | 0.51 | 0.17 | <0.05 |
| Water content[5] (%) | 0.31 | 0.21 | 0.18 | 0.4 | 0.31 |

[1]–[5]Same as in Table 1

EXAMPLE 34

A carbamate was prepared by the following procedure:

A mixture of 550 g of a 50% potassium hydroxide solution [4.91 mol], 28.6 g of 1,4-butanediol (0.32 mol), 4.75 l of water and 3 g of Mersolat H ® was introduced into a reaction vessel. This mixture was cooled externally with an ice bath. 5.43 kg (4.91 mol NCO) of isocyanate prepolymer A heated to 60° C. were added with vigorous stirring while the reaction temperature was maintained at 18°–22° C. (equivalent ratio OH⊖:butanediol-OH:NCO=1:0.13:1).

The reaction mixture was then stirred for an additional 45 minutes.

The amine was produced from this carbamate by the same procedure which was used in Example 1. The properties of the product amine are given in Table 6.

EXAMPLE 35

A carbamate was prepared by the following procedure:

A mixture of 454 g of a 50% potassium hydroxide solution (4.05 mol), 4 l of water, 5 g of Mersolat H ® and 48 g of trimethyl-1,6-hexanediol was introduced into a reaction vessel and cooled externally with an ice bath. 4.48 kg of isocyanate prepolymer G (4.05 mol NCO) heated to 60° C. were added with vigorous stirring while the reaction temperature was maintained at 20°–27° C. (equivalent ratio NCO:butanediol-OH:OH⊖=1:0.15:1). Stirring was continued for an additional 30 minutes.

The amine was prepared from this carbamate mixture in accordance with the procedure described in Example 1. The properties of the product amine are given in Table 6.

EXAMPLE 36

A carbamate was prepared by the following procedure:

A mixture of 612 g of a 50% potassium hydroxide solution [5.46 mol KOH), 4 l of water, 5 g of Mersolat H ® and 300 g of a polypropylene glycol with an average molecular weight of 1000 was introduced into a reaction vessel and cooled externally with an ice bath. 3.23 kg (5.46 mol NCO) of isocyanate prepolymer E heated to 55° C. were added over a period of 60 minutes with vigorous stirring while the reaction temperature was maintained at 18°–23° C. (equivalent ratio NCO:-polypropylene glycol-OH:OH⊖=1:0.11:1). Stirring was continued for an additional 45 minutes.

The amine was prepared from this carbamate by the same procedure as was used in Example 1. The properties of the product amine are given in Table 6.

EXAMPLE 37

A carbamate was prepared by the following procedure:

A mixture of 310 g of 50% potassium hydroxide solution (3.4 mol), 4 l of water, 3 g of Mersolat H ® and 112 g of triethanolamine ("TEA", 0.75 mol) was introduced into a reaction vessel and cooled externally with an ice bath. 3.78 kg (3.4 mol NCO) of isocyanate prepolymer A heated to 60° C. were added within 1 hour with vigorous stirring while the reaction temperature was maintained at 25°–30° C. (equivalent ratio NCO:TEA-OH:OH⊖=1:0.66:1). The reaction mixture was then stirred for 40 minutes at this temperature.

The amine was produced from this carbamate in accordance with the procedure described in Example 1. The properties of the product amine are given in Table 6.

EXAMPLE 38

This Example illustrates a continuous method for preparing the reaction mixture containing compounds with carbamate groups.

Component I was 60 kg of prepolymer A (70° C.)
Component II was a mixture of 50 kg of water, 50 g of Mersolat H ® and 8.58 kg of a 50% potassium hydroxide solution (23° C.).

Components I and II were mixed together in a 180 ml porcupine mixer operated at 3000 revs/min with a throughput of 4 kg of mixture per minutes. The stream of product discharged from the stirrer was at a temperature of 44° C. Prepolymer A was dosed into the central bore of the stirrer by a gear wheel pump. The KOH solution was fed in at an angle of 180° C. to the prepolymer through two apertures each 3 mm in diameter, using a Lewa ® pump HL 2 (manufactured by H. Ott GmbH, D725). The stirrer was not heated.

The amine was produced from this carbamate mixture by the same procedure as was used in Example 1. The properties of the product amine are given in Table 6.

TABLE 6

| Example | 34 | 35 | 36 | 37 | 38 |
|---|---|---|---|---|---|
| Yield (%) | 94 | 94 | 91 | 97 | 96 |
| Primary nitrogen[1] (%) | 0.89 | 0.88 | 1.92 | 0.84 | 1.12 |
| NH number[2] (mg KOH/g) | 35.6 | 35.2 | 76.8 | 33.6 | 44.8 |
| NH number[3] (mg KOH/g) | 40.0 | 36.9 | 80.2 | 37.5 | 46.1 |
| Total nitrogen[4] (%) | 2.41 | 2.38 | 4.38 | 2.59 | 2.51 |
| Acid number (mg KOH/g) | <0.05 | <0.05 | 0.08 | 0.12 | <0.05 |
| Water content[5] (%) | 0.17 | 0.10 | 0.10 | 0.14 | 0.08 |

[1-5]Same as in Table 1

EXAMPLE 39

An optically clear, low viscosity solution was prepared from 100 g of an amino polyester with NH number 55.6 prepared from isocyanate prepolymer G by a method analogous to that of Example 8, 8 g of 1,4-butanediol (mixture −OH+NH number: 143.7), 261 g of dimethylformamide and 174 g of toluene by stirring at room temperature. 37 g (148 mmol) of 4,4′-diisocyanatodiphenylmethane were added to this solution over a period of 30 minutes and the reaction mixture was stirred for 4 hours at room temperature. No isocyanate content (IR spectroscopy) could be detected at the end of this time.

The solution was poured on to a glass plate to form a film about 1 mm in thickness and was kept at room temperature for one hour and then heated to 120° C. for 2 hours.

A tack-free, highly elastic film with excellent tensile strength and folding strength was obtained.

EXAMPLE 40

An optically clear, low viscosity solution was prepared from 50 g of the aminopolyester used in Example 14, 4 g of 1,4-butanediol (mixture OH+NH number: 127.7), 130.5 g of dimethylformamide and 67 g of toluene by stirring at room temperature. 18.5 g (74 mmol) of 4,4′-diisocyanatodiphenylmethane were added to this solution over a period of 70 minutes. Towards the end of this addition, which was carried out at room temperature, the solution thickened considerably but thickening disappeared on heating to 45° C.

The solution was poured on to a glass plate to form a film about 1 mm in thickness, which was kept at room temperature for one hour and then heated to 120° C. for 2 hours.

A completely tack-free, elastic film with improved tear resistance and tensile strength (compared with Example 39) was obtained.

Althouth the invention has been described in detail in the foregoing for the purpcse of illustration, it is to be understood that such. detail is solely for that purpose and that variations can be made therein by those skilled in the art without departing from the spirit and scope of the invention except as it may be limited by the claims.

What is claimed is:

1. A process for the production of an aromatic polyamine containing aromatic primary amino groups and urethane and polyester groups by
   (a) hydrolyzing
      (i) an isocyanate compound having aromatic isocyanate groups and an isocyanate content of from 0.5 to 11.5 wt % which isocyanate compound also contains urethane and polyester groups in the presence of
      (ii) a compound selected from the group consisting of alkali metal hydroxides, alkaline earth metal hydroxides, alkali metal silicates, alkali metal sulfides, alkali metal cyanides, tetraalkylammonium hydroxides and mixtures thereof; and
      (iii) water in a quantity such that at least one mole of water is present for each equivalent of NCO groups; and
   (b) treating the hydrolyzed mixture to convert the carbamate formed in (a) to polyamine 2. The process of claim 1 in which the isocyanate compound (i) is dissolved in solvent which is inert with respect to isocyanate groups.

3. The process of claim 1 in which a compound having a molecular weight of from 18 to 399 and at least one hydroxyl and/or amino and/or other H-active group is present during the hydrolysis (a).

4. The process of claim 1 in which step (b) includes treating the product of step (a) with a proton donor to neutralize any remaining compound (ii).

5. The process of claim 4 in which at least one equivalent of proton donor for each equivalent of compound (a)(ii) is employed.

6. The process of claim 5 in which the proton donor is selected from the group consisting of mineral acids, organic acids, acids fixed in an insoluble polymer skeleton and mixtures thereof.

7. The process of claim 4 in which any excess proton donor is neutralized.

8. The process of claim 1 in which step (b) includes treating the product of step (a) with heat.

9. The process of claim 1 in which step (b) includes treating the product of (a) with a solvent.

10. The process of claim 1 in which step (b) includes treating the product of (a) with a solvent and subsequently with heat.

11. The process of claim 1 in which the isocyanate compound (i) is an isocyanate prepolymer containing from 2 to 8 aromatic isocyanate groups and having an isocyanate content of from 1.7 to 7.2 wt %.

12. The process of claim 11 in which the isocyanate prepolymer is obtained by chemical addition of an aromatic polyisocyanate to a relatively high molecular weight polyester in an active hydrogen to isocyanate equivalent ratio of from 1.5 to 2.8.

13. The process of claim 11 in which the isocyanate prepolymer is obtained by chemical addition of an aromatic polyisocyanate to a high molecular weight polyester having 2 to 8 hydroxyl groups and up to 50 wt % relatively high molecular weight polyhydroxyl compound containing 2 to 8 hydroxyl groups.

14. The process of claim 13 in which the high molecular weight polyhydroxyl compound is selected from the group consisting of polyethers, polyacetals, polythioethers, polysiloxanes, polybutadienes and mixtures thereof having a molecular weight of from 500 to 5000.

15. The process of claim 12 in which a di- to tetrafunctional chain lengthening agent having a molecular weight of from 18 to 399 is employed in the production of the isocyanate prepolymer.

16. The process of claim 11 in which the temperature during hydrolysis is maintained below 40° C.

17. The process of claim 1 in which the isocyanate compound (i) is an isocyanate prepolymer having 2 to 3 aromatic isocyanate groups produced from a hydroxy polyester having a molecular weight of from 1000 to 4000 and an aromatic diisocyanate which prepolymer has an isocyanate content of from 1.7 to 7.2 wt %.

18. The process of claim 17 in which a relatively high molecular weight polyhydroxyl compound and/or a chain lengthening agent is used in the production of the prepolymer.

19. The process of claim 1 in which the compound (ii) is an alkali metal hydroxide, an alkaline earth metal hydroxide and/or tetraalkylammonium hydroxide.

20. The process of claim 19 in which the compound (ii) is used in a quantity such that the equivalent ratio of compound (ii) to isocyanate groups is from 0.3:1 to 2:1.

21. The process of claim 20 in which a solvent and/or excess water and/or low molecular weight compounds containing H-active groups is present.

22. The process of claim 1 in which a compound containing hydroxyl and/or amino groups having a molecular weight of from 62 to 250 and from 2 to 4 H-active groups is also present during the hydrolysis.

23. The process of claim 1 in which step (b) includes treating the product of step (a) with heat at a temperature of up to 200° C. and application of a vacuum.

24. The process of claim 1 in which step (b) includes extraction of the product of step (a) with an organic solvent which is immiscible with water.

25. A process for the production of a polyurethane by reacting a polyisocyanate with a polyamine in which the polyamine is produced by the process of claim 1.

26. An aromatic polyamine containing aromatic primary amino, urethane and polyester groups made by
  (a) hydrolyzing
    (i) an isocyanate compound having aromatic isocyanate groups and an isocyanate content of from 0.5 to 11.5 wt % which isocyanate compound also contains urethane and polyester groups in the presence of
    (ii) a compound selected from the group consisting of alkali metal hydroxides, alkaline earth metal hydroxides, alkali metal silicates, alkali metal sulfides, alkali metal cyanides, tetraalkylammonium hydroxides and mixtures thereof and
    (iii) water in a quantity such that at least one mole of water is present for each equivalent of NCO groups; and
  (b) treating the hydrolyzed mixture to convert the carbamate formed in (a) to polyamine.

27. The polyamine of claim 26 in which an isocyanate prepolymer was the starting isocyanate compound.

* * * * *